United States Patent
Kamps et al.

(10) Patent No.: US 9,802,459 B2
(45) Date of Patent: Oct. 31, 2017

(54) SELF-CONTAINED FLAMELESS FLUID HEATING SYSTEM

(71) Applicant: Multitek North America, LLC, Prentice, WI (US)

(72) Inventors: Douglas Kamps, Minocqua, WI (US); Timothy C. Stolar, Rhinelander, WI (US); Thomas J. Umlauf, Rhinelander, WI (US)

(73) Assignee: Multitek North America, LLC, Prentice, WI (US)

( * ) Notice: Subject to any disclaimer, the term of this patent is extended or adjusted under 35 U.S.C. 154(b) by 1157 days.

(21) Appl. No.: 13/723,767

(22) Filed: Dec. 21, 2012

(65) Prior Publication Data

US 2014/0174691 A1   Jun. 26, 2014

(51) Int. Cl.
 F24H 1/06   (2006.01)
 B60H 1/00   (2006.01)
 F24D 15/02  (2006.01)
 F24H 1/00   (2006.01)

(52) U.S. Cl.
 CPC ......... B60H 1/00264 (2013.01); F24D 15/02 (2013.01); F24H 1/009 (2013.01); F24H 1/06 (2013.01); F24D 2200/18 (2013.01); F24D 2200/26 (2013.01)

(58) Field of Classification Search
 CPC ..... F22B 3/06; F24H 1/06; F24J 3/003; E21B 36/00; B50H 1/00264; F24D 15/02
 See application file for complete search history.

(56) References Cited

U.S. PATENT DOCUMENTS

| | | | | |
|---|---|---|---|---|
| 3,198,191 A * | 8/1965 | Wyszomirski | ............ | F22B 3/06 126/247 |
| 4,264,826 A * | 4/1981 | Ullmann | ................ | F01K 17/005 122/26 |
| 4,686,378 A * | 8/1987 | Sisk | ........................ | F01K 17/02 165/58 |
| 5,222,696 A * | 6/1993 | Brigham | ............... | B64F 5/0054 244/134 R |
| 5,279,262 A * | 1/1994 | Muehleck | ............... | F16D 57/00 122/26 |
| 5,656,136 A | 8/1997 | Gayaut et al. | | |
| 5,894,883 A | 4/1999 | Gentry et al. | | |
| 5,988,280 A | 11/1999 | Crawford et al. | | |

(Continued)

*Primary Examiner* — Avinash Savani
*Assistant Examiner* — Deepak Deean
(74) *Attorney, Agent, or Firm* — Andrus Intellectual Property Law, LLP

(57) ABSTRACT

A heating system is connected to a source of supply fluid to be heated, and has an internal combustion engine provided with engine coolant and gases that flow to and from the engine, and are heated thereby. A heat generator is provided in fluid communication with a supply of heat transfer fluid for circulating the heat transfer fluid in the heat generator causing fluid friction to create heat directly in the heat transfer fluid, and provide heated transfer fluid that is not in fluid communication with the engine. A fluid heat exchanger arrangement is provided in fluid communication with the supply fluid, the engine coolant, the gases of the engine and the heated transfer fluid for transferring heat from the heated engine coolant, the heated engine gases, and the heated transfer fluid to heat the supply fluid.

21 Claims, 17 Drawing Sheets

(56) References Cited

U.S. PATENT DOCUMENTS

| | | | | |
|---|---|---|---|---|
| 6,761,135 B1* | 7/2004 | Becktold | ................ | B08B 3/026 122/396 |
| 7,037,105 B2* | 5/2006 | Hayes | ................... | E21B 36/005 166/302 |
| 7,424,916 B2* | 9/2008 | Foster | ..................... | E21B 37/00 166/303 |
| 7,614,367 B1* | 11/2009 | Frick | ....................... | F22B 27/04 122/26 |
| 7,637,232 B2* | 12/2009 | Foster | ..................... | F22B 3/06 122/26 |
| 7,766,077 B2* | 8/2010 | Masters | ................. | F24D 17/00 165/200 |
| 8,371,251 B2* | 2/2013 | Frick | ....................... | F01K 27/02 122/406.1 |
| 2004/0144200 A1 | 7/2004 | Giordano et al. | | |
| 2005/0039906 A1* | 2/2005 | Foster | ..................... | E21B 37/00 166/57 |
| 2006/0185621 A1* | 8/2006 | Foster | ................... | F22B 1/1807 122/26 |
| 2010/0000508 A1 | 1/2010 | Chandler | | |
| 2011/0005757 A1* | 1/2011 | Hebert | ................. | E21B 36/006 166/302 |
| 2011/0120427 A1 | 5/2011 | Andersson | | |
| 2011/0185713 A1 | 8/2011 | Koopmann et al. | | |
| 2012/0048717 A1* | 3/2012 | Frick | ....................... | F01K 27/02 203/22 |
| 2012/0210953 A1 | 8/2012 | Cronin | | |
| 2013/0189629 A1* | 7/2013 | Chandler | ................. | F24H 1/06 431/11 |
| 2014/0144641 A1* | 5/2014 | Chandler | ................. | F24H 1/08 166/303 |
| 2014/0345544 A1* | 11/2014 | Cooper | ................... | F24H 1/125 122/31.2 |
| 2016/0138834 A1* | 5/2016 | Brookins | ................ | F24J 3/003 126/247 |

\* cited by examiner

SELF-CONTAINED FLAMELESS FLUID HEATING SYSTEM

FIELD

The present disclosure relates generally to fluid heating systems, and more particularly, pertains to a self-contained, flameless mobile heating system for heating a fluid, such as water or a water-based liquid, at a remote work site.

BACKGROUND

In certain applications, mobile heating systems are utilized to heat liquids, such as water or water-based solutions, collectively termed process water, for distribution through tanks and reservoirs. For example, one such application commonly known as a hydraulic fracturing or "frac job", involves injecting large quantities of a heated aqueous solution into a subterranean formation of an oil or gas well to hydraulically fracture the formation to release the oil or gas. Such frac jobs are normally used to initiate production in low permeability reservoirs, or to re-stimulate production in older producing wells. The heated water is typically combined with and acts to dissolve a mixture of chemical additives, propants (light sand) and a guar gel, that helps carry the sand down into the well. This tracing liquid solution is injected into a well at a high flow rate and pressure to break up the formation, and help the gas or oil flow towards the surface.

Hydraulic fracturing is performed at remote well sites and usually requires a short period of time to complete. Consequently, the construction of a permanent heating facility at the site is not cost effective, accordingly a mobile heating system employing one or more heat exchangers is commonly used. Such known mobile heating systems need to be designed mindful of current US government safety regulations which provide that open flame heating of the aqueous solution cannot take place in the immediate vicinity of the well. While safety concerns are of overriding importance, compliance with such "no flame" regulations requires additional time and expense to provide the requisite liquid heating. As a result, known mobile heating systems are found to provide less than homogenous temperature distribution of heated water solutions through tanks and reservoirs, and a less than desired pumping behavior throughout the system. Accordingly, improvements in providing a flameless, self-contained mobile system for heating supply fluids, and particularly water and water-based liquids, are highly desirable.

SUMMARY

The present disclosure relates to a heating system connected to a source of supply fluid to be heated, and having an internal combustion engine provided with engine coolant and gases that flow to and from the engine, and are heated thereby. A heat generator is provided in fluid communication with a supply of heat transfer fluid for circulating the heat transfer fluid within the heat generator and causing fluid friction to create heat directly in the heat transfer fluid, and provide heated transfer fluid that is not in fluid communication with the engine. A fluid heat exchanger arrangement is provided in fluid communication with the supply fluid, the engine coolant, the gases of the engine and the heated transfer fluid for transferring heat from the heated engine coolant, the heated engine gases and the heated transfer fluid to heat the supply fluid.

The heated transfer fluid is provided independently by the heat generator without a need for any heat exchanger to heat the heat transfer fluid in advance of the fluid heat exchanger arrangement. The heat generator is mechanically driven by the engine. The heat generator has a housing, a shaft rotatably mounted in the housing and driven by a rotatable crankshaft of the engine and a rotor mounted on the shaft within the housing such that heat transfer fluid is received and circulated in the housing by means of the rotation of the rotor. The heating system also includes a heat transfer fluid reservoir for holding the heat transfer fluid. A charge pump is provided in fluid communication with the heat transfer fluid reservoir for transferring heated transfer fluid to the heat generator and to the fluid heat exchanger arrangement.

The fluid heat exchanger arrangement includes a charged air cooler or "CAC" heat exchanger in fluid communication with the supply fluid and the hot gases exiting from a turbo compressor discharge of the engine for transferring heat from the hot gases of the turbo compressor discharge to the supply fluid to heat the supply fluid, and for enabling return of cooled gases to an air intake manifold of the engine.

The fluid heat exchanger arrangement also includes an engine coolant heat exchanger in fluid communication with the heated supply fluid from the CAC heat exchanger and the heated engine coolant of the engine for transferring heat from the heated engine coolant to the heated supply fluid exiting the CAC heat exchanger, and for enabling cooled engine coolant to return to the engine.

The fluid heat exchanger arrangement further includes an exhaust exchanger in fluid communication with the heated supply fluid from the engine coolant heat exchanger and exhaust gas exiting from the engine for transferring heat from the exhaust gas to the heated supply fluid exiting the engine coolant heat exchanger, and for enabling discharge of the cooled exhaust gas to the atmosphere.

The fluid heat exchanger arrangement additionally includes a heat transfer fluid heat exchanger in fluid communication with the heat generator and the supply fluid for receiving the heated transfer fluid from the heat generator and transferring heat from the heated transfer fluid to the supply fluid. In an exemplary embodiment, the engine, the heat generator and the fluid heat exchanger arrangement are mounted on a mobile trailer.

The present disclosure further relates to a heating system including an internal combustion engine provided with engine coolant and gases that flow to and from the engine, and are heated thereby. A supply source provides a supply fluid, and a pump is provided in fluid communication with the supply source for transferring the supply fluid. A fluid heat exchanger arrangement is provided in fluid communication with the supply fluid of the supply source and the engine coolant and the gases of the engine for receiving heated engine coolant and heated gases, and transferring heat from the heated engine coolant and the heated engine gases to the supply fluid to supply heated supply fluid. A heat generator is provided in fluid communication with a heat transfer fluid reservoir containing a heat transfer fluid for receiving heat transfer fluid from the heat transfer reservoir and for circulating the heat transfer fluid within the heat generator to create fluid friction therein to heat the heat transfer fluid and provide heated transfer fluid. A heat transfer fluid heat exchanger is provided in fluid communication with the heat generator and the supply fluid for receiving the heated transfer fluid from the heat generator, and transferring heat from the heated transfer fluid to the supply fluid to further provide heated supply fluid.

The heating system further includes a main pump in fluid communication with the supply fluid for moving the supply fluid through the fluid heat exchanger arrangement and the heat transfer fluid heat exchanger. This pump is driven by the internal combustion engine, and includes an inlet and an outlet. The supply source is in fluid communication with a supply fluid inlet and an inlet manifold that is in fluid communication with the inlet of the pump. The outlet of the pump is in fluid communication with an outlet manifold that is in fluid communication with a supply fluid outlet receiving the heated supply fluid. The inlet manifold and the outlet manifold are in fluid communication with the supply fluid, the fluid heat exchanger arrangement and the heat transfer fluid heat exchanger. The fluid heat exchanger arrangement includes a CAC heat exchanger, an engine coolant heat exchanger, and an exhaust heat exchanger. A charge pump is provided in fluid communication with the heat transfer fluid reservoir for transferring heat transfer fluid to the heat generator. The main pump, the charge pump and the heat generator are mechanically driven by the engine. The engine, the fluid heat exchanger arrangement, the heat generator and the heat transfer fluid heat exchanger are located on a mobile trailer provided with an enclosure, a set of ground engaging wheels and a hitching arrangement. The supply source is preferably a supply reservoir located remote from the mobile trailer.

The present disclosure further relates to a heating system including an internal combustion engine provided with an engine coolant and gases that flow to and from the engine, and are heated thereby. A supply source provides a supply fluid in fluid communication with a supply fluid inlet, and a supply fluid outlet is provided in fluid communication with the supply fluid inlet. A pump has a pump inlet in fluid communication with an inlet manifold and the supply fluid inlet, and a pump outlet in fluid communication with an outlet manifold and the supply fluid outlet. The pump, the inlet and outlet manifolds and the supply fluid inlet and outlet are connected together to define a main flow path such that the pump transfers supply fluid along the main flow path from the supply fluid inlet through the inlet and outlet manifolds to the supply fluid outlet. A fluid heat exchanger is provided in fluid communication with the supply fluid of the supply source and the engine coolant and gases of the engine for receiving heated engine coolant and heated gases of the engine. A heat generator is provided in fluid communication with a heat transfer fluid reservoir containing a heat transfer fluid for receiving the heat transfer fluid and circulating the heat transfer fluid within the heat generator to create fluid friction therein to directly heat the heat transfer fluid and provide heated transfer fluid. A heat transfer fluid heat exchanger is provided in fluid communication with the heat generator and the supply fluid for receiving heated transfer fluid from the heat generator. A first portion of the supply fluid is diverted from the main flow path and the outlet manifold to the fluid heat exchanger arrangement such that heat from the heated engine gases and the heated engine coolant is transferred to the supply fluid to provide a first source of heated supply fluid to the inlet manifold and the main flow path. A second portion of the supply fluid is diverted from the main flow path and the outlet manifold to the heat transfer fluid heat exchanger such that heat from the heated transfer fluid is transferred to the supply fluid to provide a second source of heated supply fluid to the inlet manifold and the main flow path. The first and second sources of heated supply fluid are delivered by the pump along the main flow path to the supply fluid outlet.

BRIEF DESCRIPTION OF THE DRAWINGS

The best mode of carrying out the disclosure is described herein below with reference to the following drawing figures.

DETAILED DESCRIPTION

Figure 1:
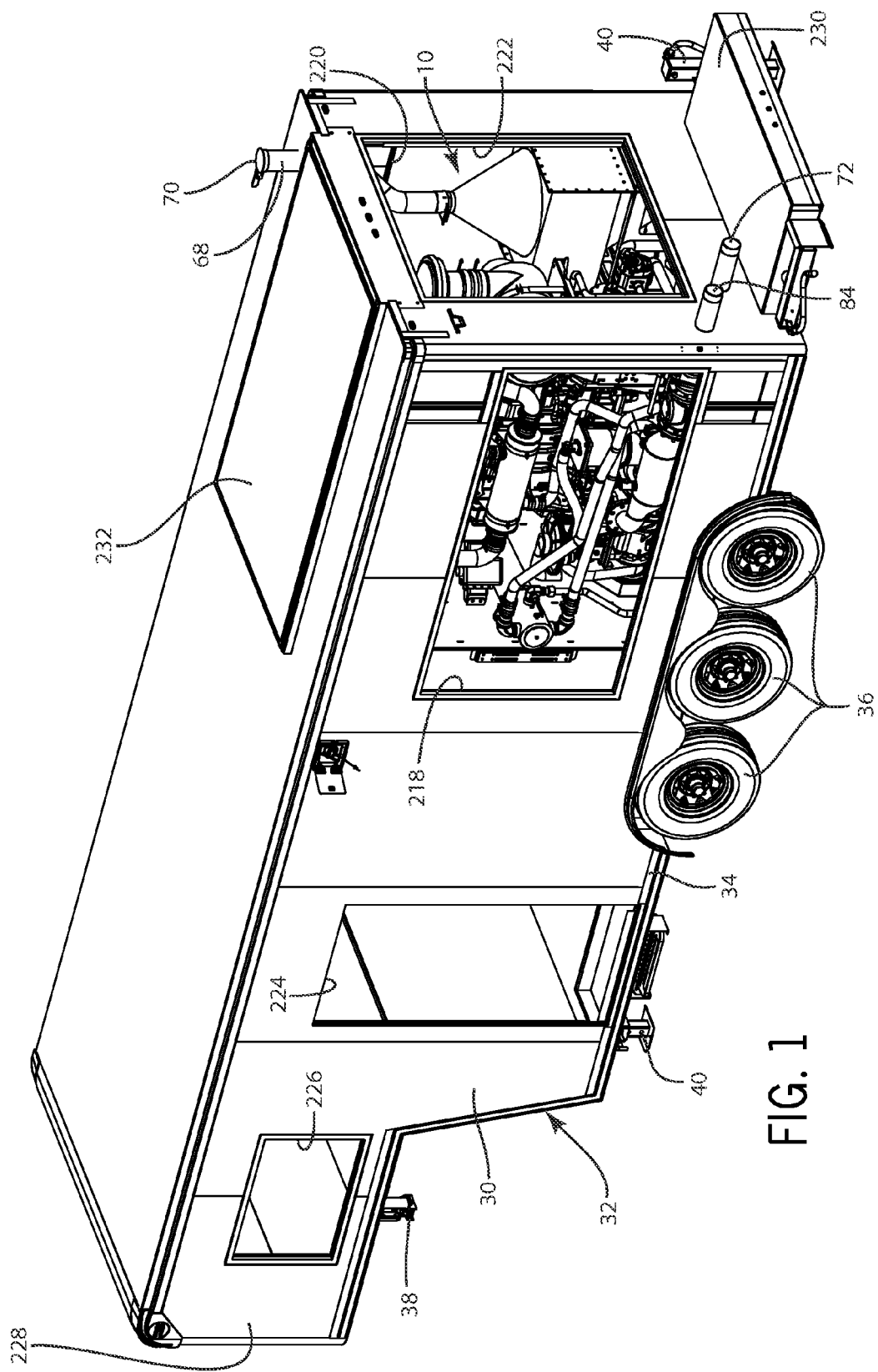
FIG. 1 is a perspective view of a self-contained, flameless fluid heating system in accordance with the present disclosure with doors of a surrounding mobile enclosure removed for clarity.

Referring now to FIGS. 1-6, thereshown is a self-contained, flameless fluid heating system 10 in accordance with the present disclosure. In one embodiment, shown in the drawings, the heating system 10 is a mobile, trailer-based heater that circulates and heats a supply fluid, such as water or a water-based liquid solution, that is typically held in a supply reservoir at an ambient temperature. However, the system 10 need not be trailer based or mobile. In an exemplary application, the heating system 10 is particularly useful in heating a supply fluid and transferring that heated supply fluid at high flow rates to enable a homogenous temperature distribution through tanks and reservoirs, such as may be used in connection with a hydraulic fracturing job at a remote well site.

The heating system 10 is generally comprised of a group of main operating components including an internal combustion engine 12, a water pump arrangement 14, a CAC (charged air cooler) heat exchanger 16, an engine coolant heat exchanger 18, an exhaust heat exchanger 20, a heat transfer fluid reservoir 22, a heat generator 24 and a heat transfer fluid heat exchanger 26. As will be further described below, the four heat exchangers 16, 18, 20, 26 operate to transfer various sources of heat to the supply fluid. The main operating components of the heating system 10 are protectively housed and variously supported on a main deck 28 of a surrounding wall structure defining an enclosure 30 mounted on a mobile vehicle in the form of a trailer 32 designed to be transported by a towing vehicle. The trailer 32 has a framework 34 provided with a set of ground engaging wheels 36 and a hitching apparatus 38 including a support jack arrangement 40. It should be understood that the trailer 32 may be suitably replaced by a self-propelled mobile vehicle housing the main operating components of the heating system 10.

Figure 7:
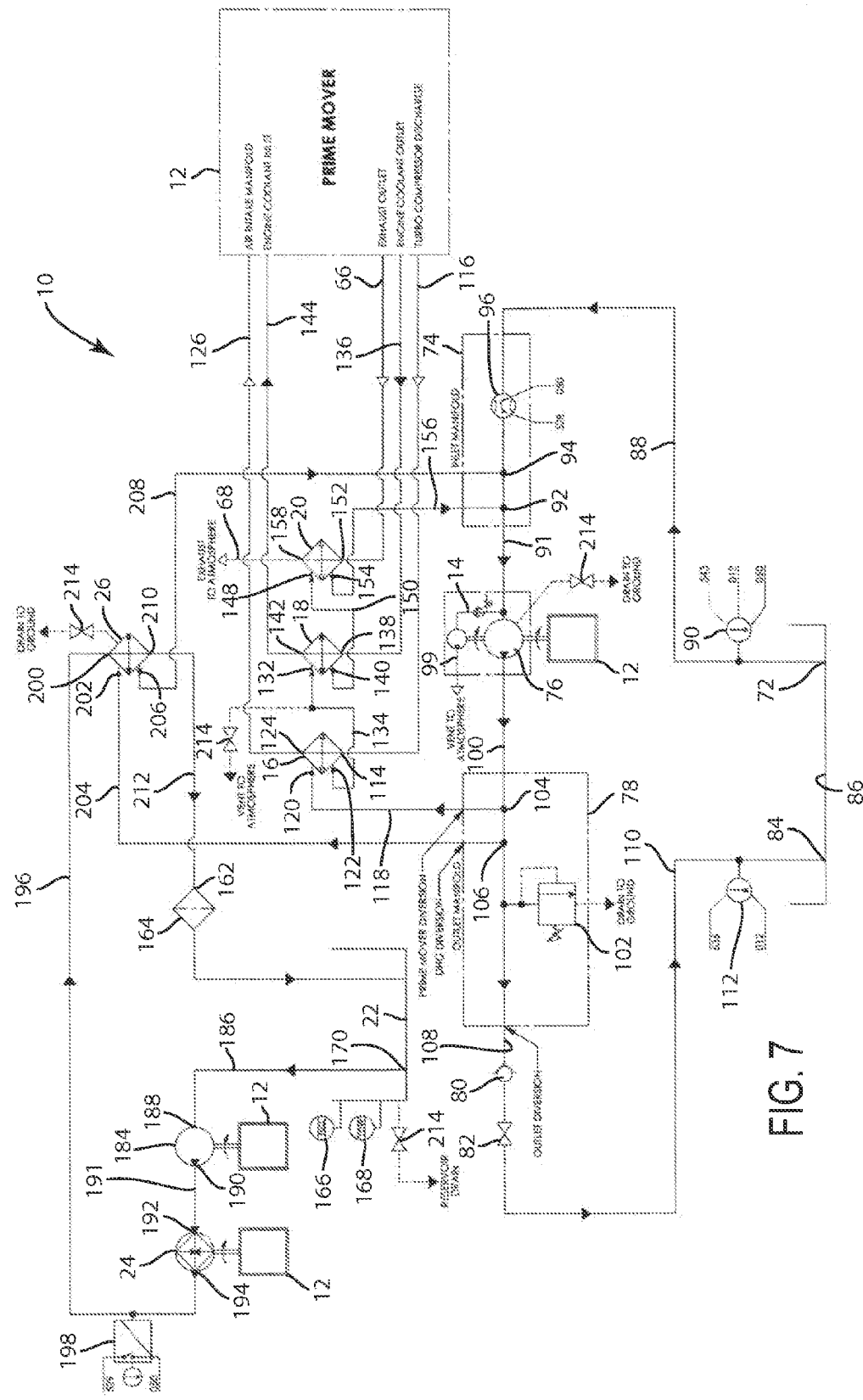
FIG. 7 is a schematic diagram of the heating system.

In the description to follow, FIGS. 1-6 illustrate the physical relationship and proximity of the main operating components. FIG. 7 depicts the schematic interconnection of the main operating components. FIGS. 8-17 show isolated views of the main operating components.

Figure 2:
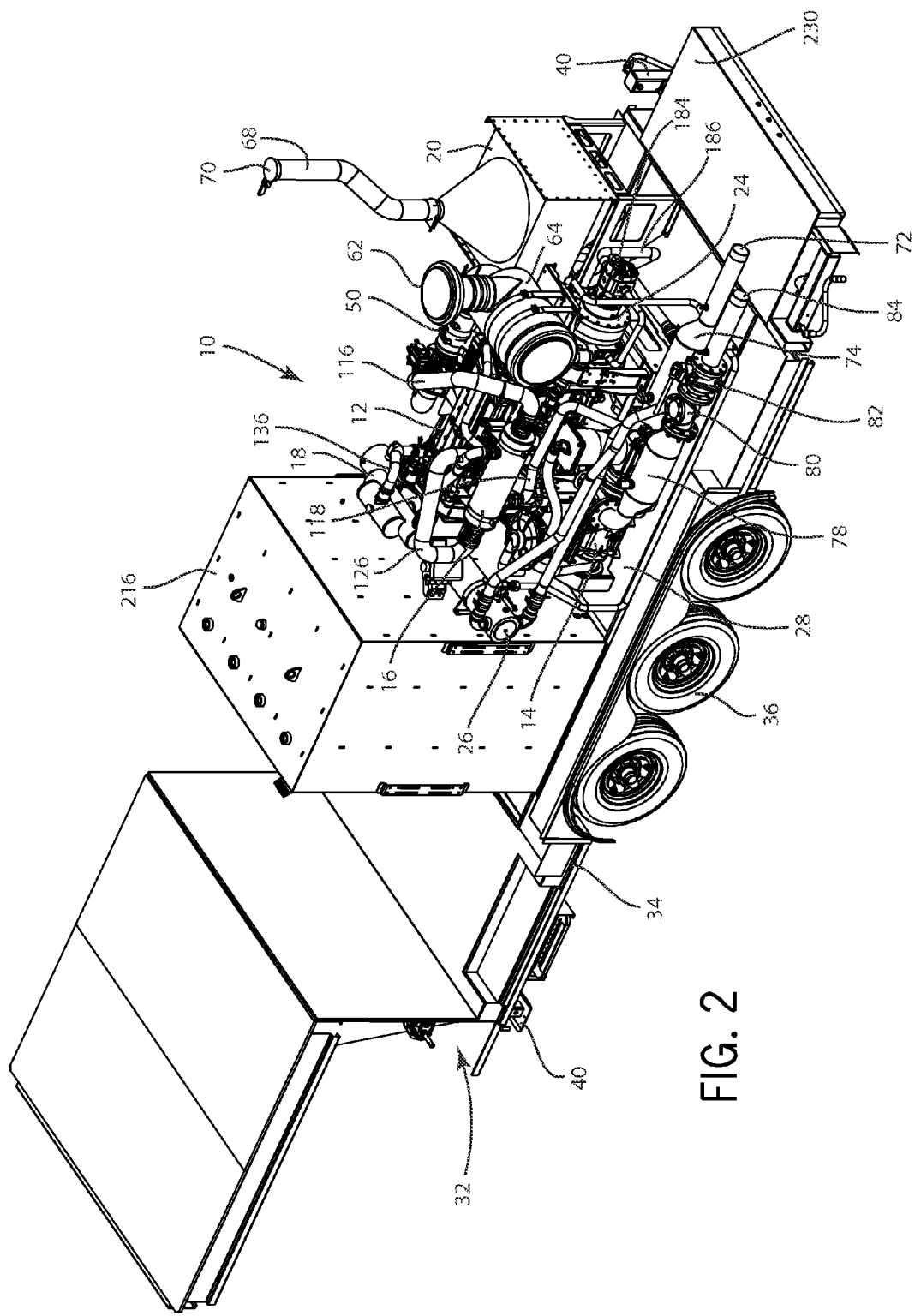
FIG. 2 is a further view of the heating system of FIG. 1 with the entire enclosure removed.
Figure 3:
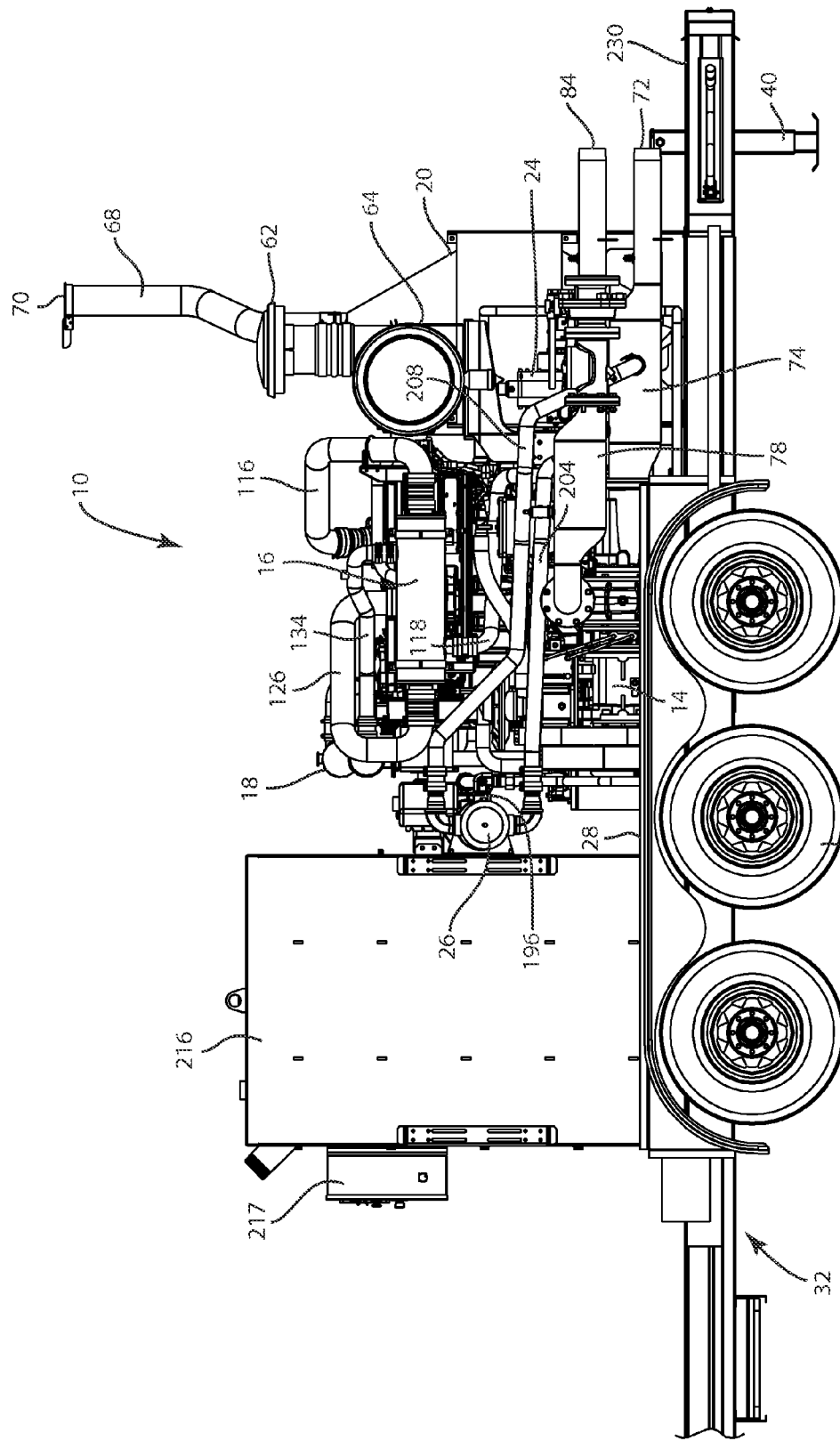
FIG. 3 is a vertical sectional view of the heating system taken from the left side of FIG. 1.
Figure 4:
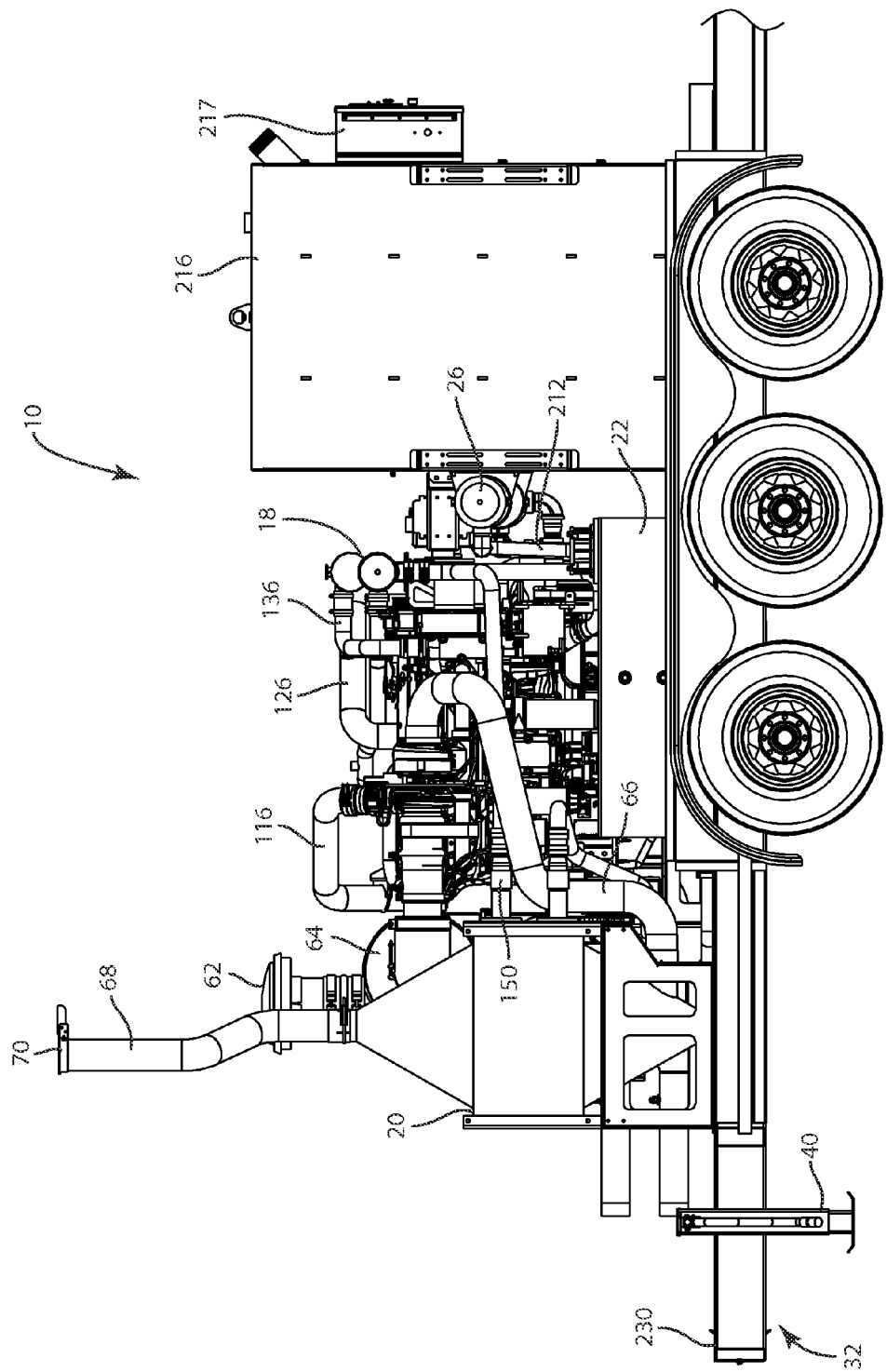
FIG. 4 is a vertical sectional view of the heating system taken from the right side of FIG. 1.
Figure 5:
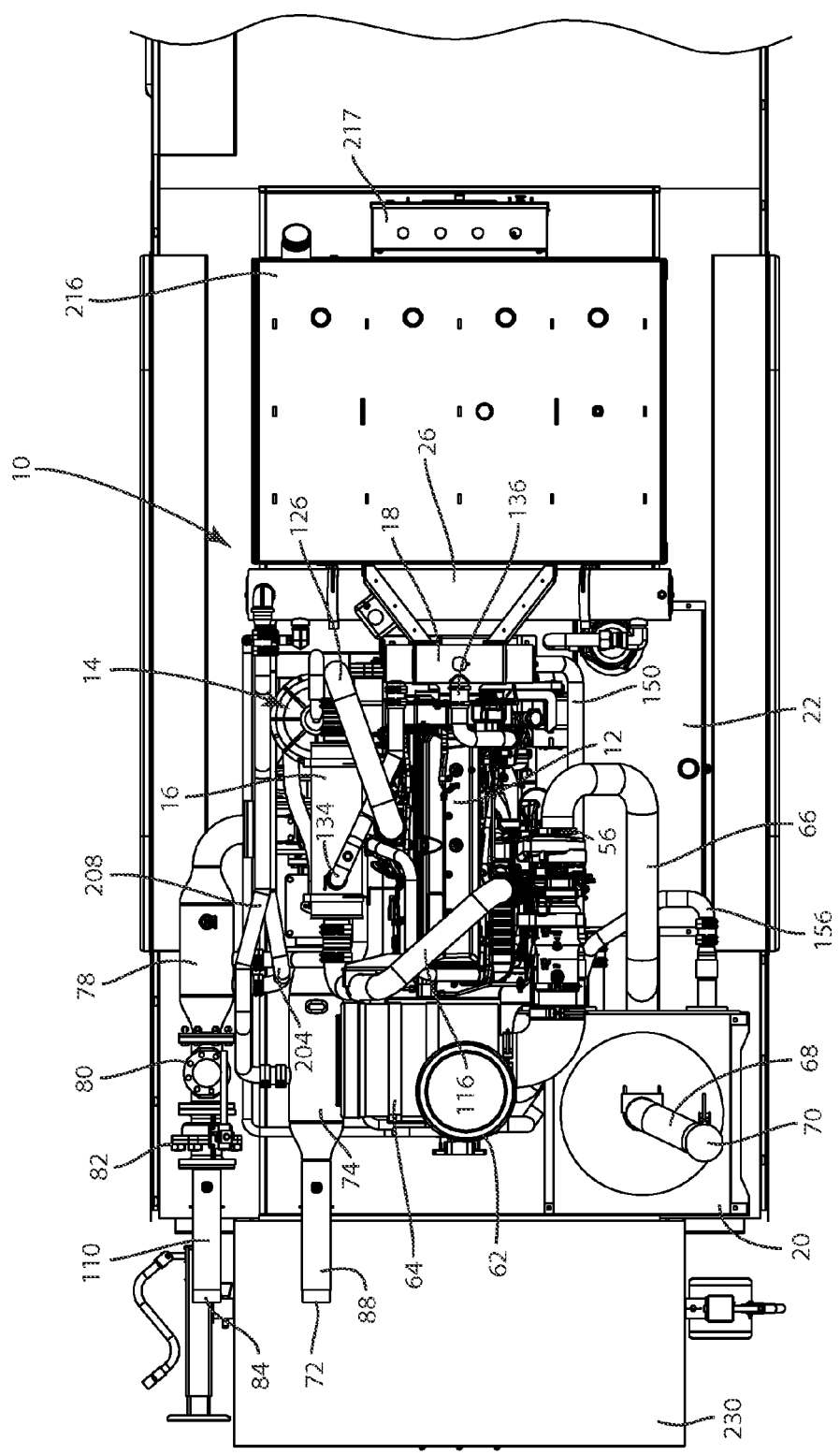
FIG. 5 is a top perspective view of the heating system of FIG. 1.
Figure 6:
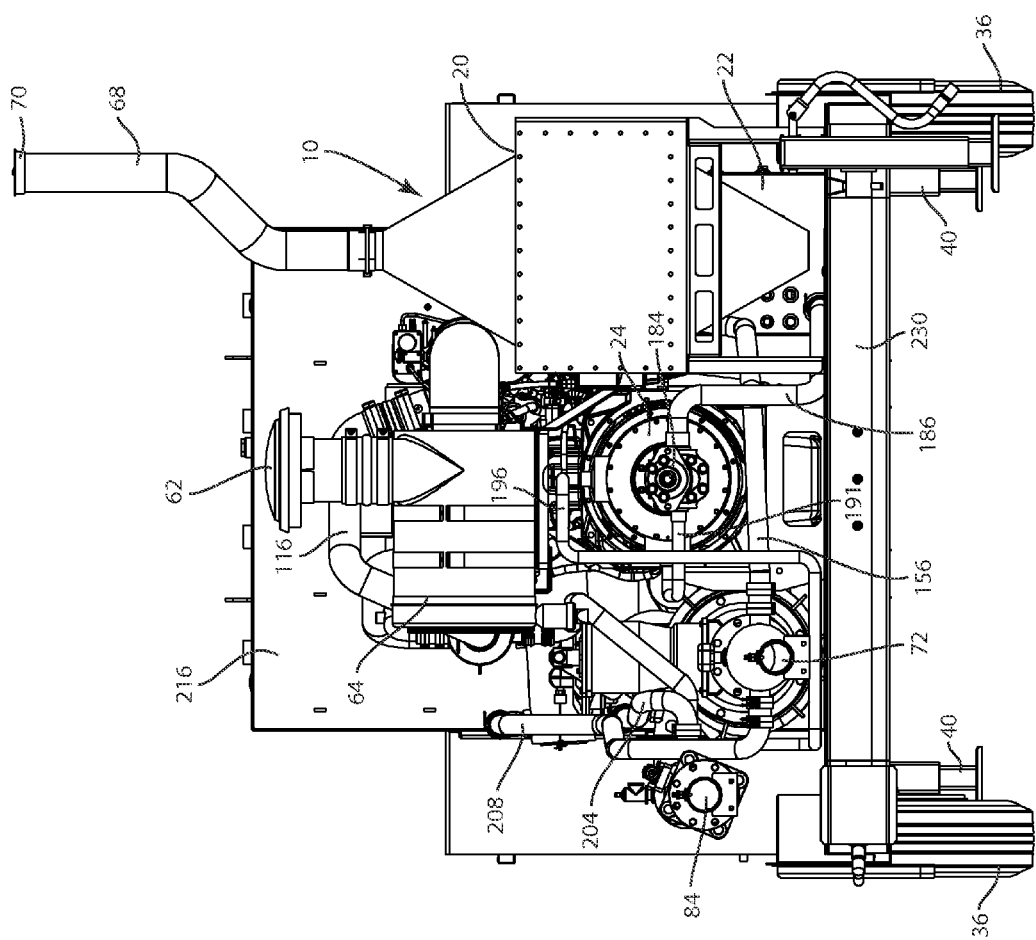
FIG. 6 is a rear view of the heating system of FIG. 1.
Figure 8:
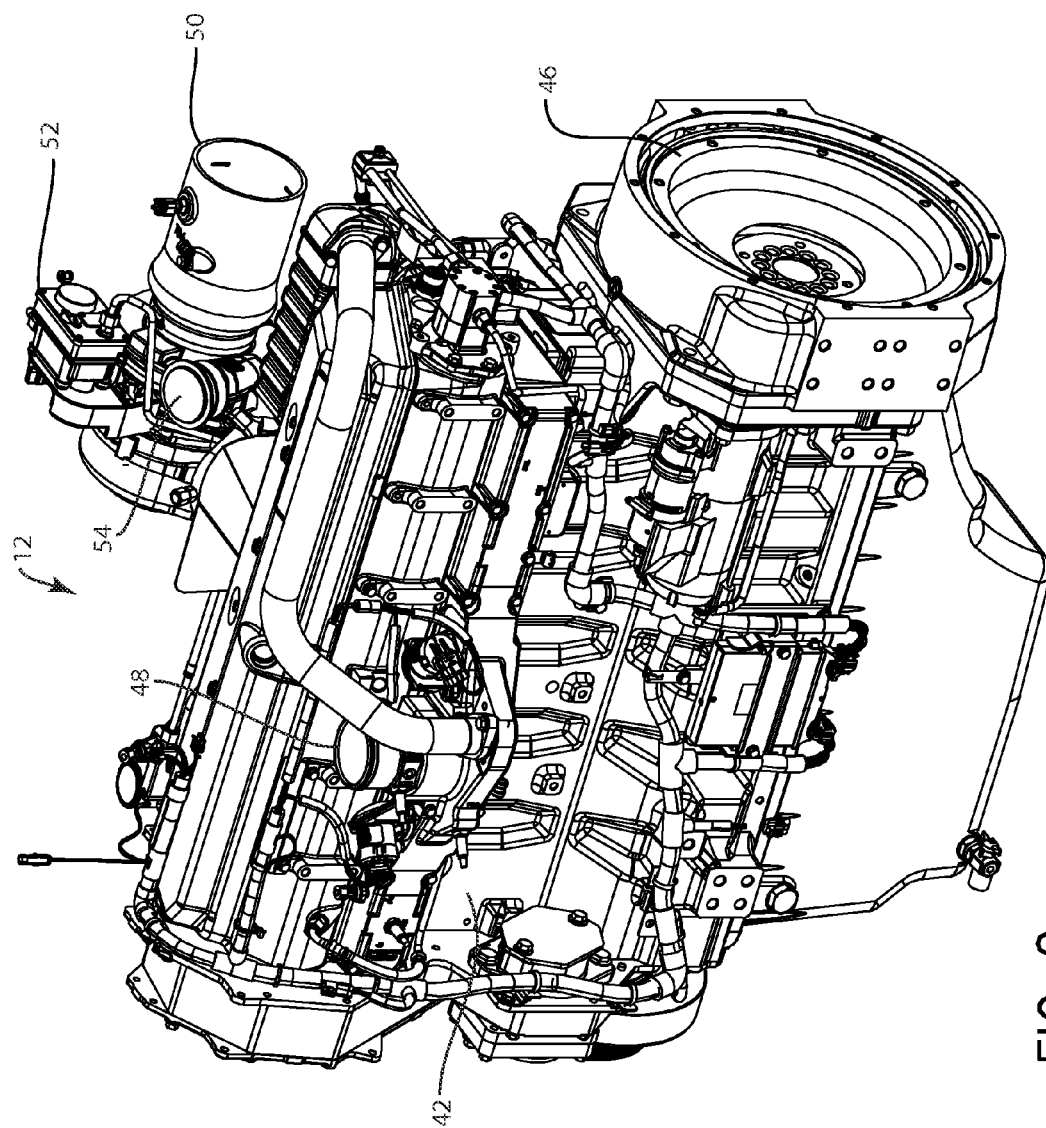
FIGS. 8 and 9 are perspective views of an internal combustion engine used in the heating system.
Figure 9:
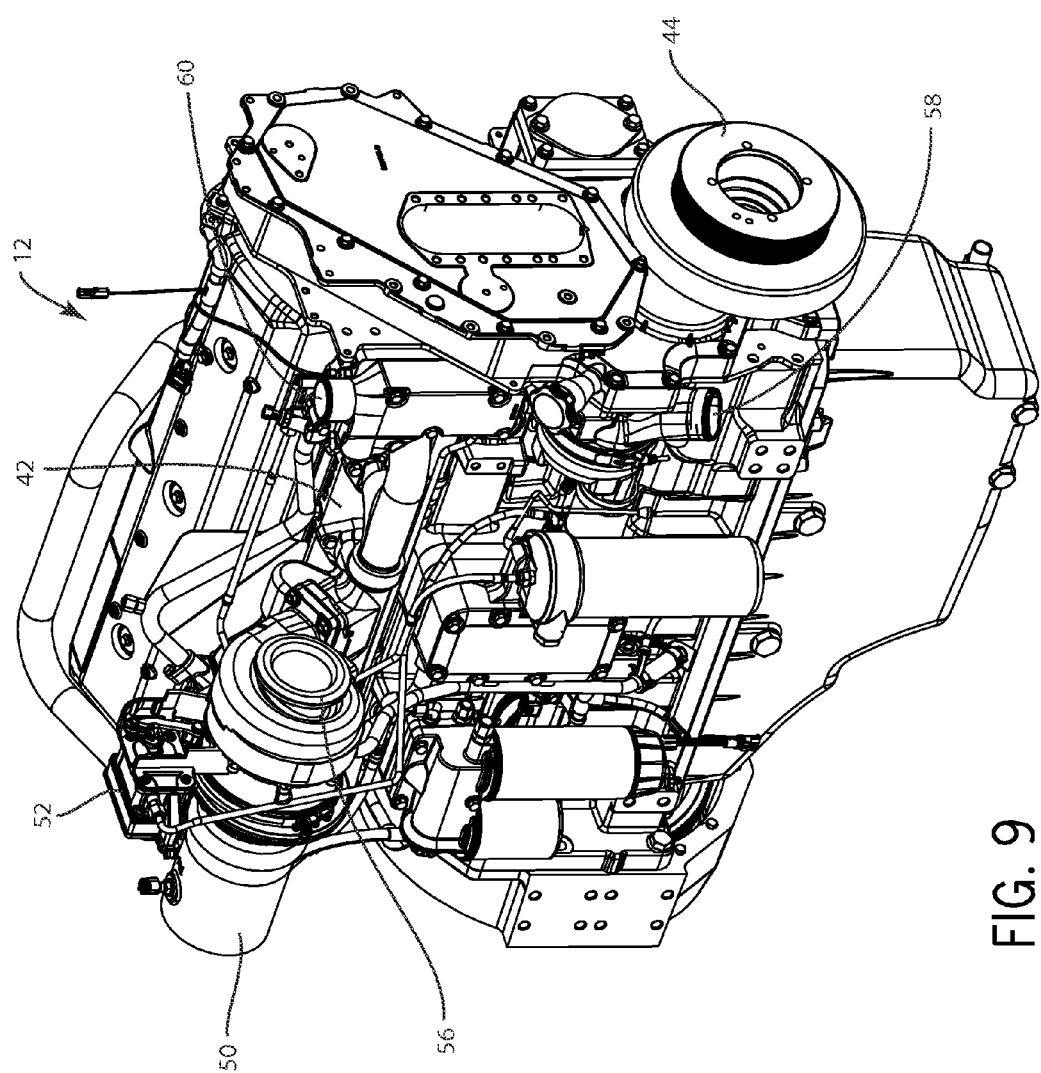

The internal combustion engine 12 drives the heating system and is preferably embodied in a diesel engine, such as represented in isolated views of FIGS. 8 and 9. The diesel engine 12 is suitably supported on the main deck 28 of the trailer 32, and is constructed with typical components that are necessary to facilitate prime mover operation. These engine components include an engine block 42 having a driven rotatable crankshaft, a rotatable crankshaft pulley 44, a rotatable flywheel 46, an air intake manifold 48, an air inlet 50, a turbo charger 52 having a compressor discharge 54, an exhaust outlet 56, a coolant inlet port 58 and a coolant outlet port 60. With reference to FIGS. 2 and 5, the air inlet 50 is connected to an air intake assembly 62 including an air cleaner 64 for drawing air into the engine 12. Exhaust outlet 56 is connected to an exhaust conduit 66 that is routed through the exhaust heat exchanger 20. The heat exchanger 20 has a discharge pipe 68 with an outlet so that the engine exhaust gas is discharged outside the top of the enclosure 30. The outlet of discharge pipe 68 is covered with a protective rain cap 70 which normally permits the opening of the outlet in the presence of exhaust gas flow, and closes to prevent entry of precipitation and other foreign items when there is no exhaust gas flow.

The internal combustion engine operates at high temperatures and thus requires continuous or intermittent cooling during operation to prevent thermal breakdown and to increase efficiency. Accordingly, as is well known, the engine 12 also typically includes a water jacket in fluid communication with the inlet port 58 and the outlet port 60 to allow engine coolant, such as a liquid antifreeze and water solution, to be pumped through the engine 12. As further will be explained below, the water jacket, is operably connected to the engine coolant heat exchanger 18. In addition, the turbo compressor discharge 54 of the engine 12 is operably connected to the CAC heat exchanger 16, and the exhaust outlet 56 of the engine 12 is operably connected to the exhaust heat exchanger 20.

An electrical source for actuating the engine 12 and providing auxiliary power is provided by a set of batteries (not shown) mounted on the trailer 32. Other well-known engine related components such as filters, pumps, pulleys and belts are not specifically identified in FIGS. 8 and 9, but the scope and content of the these components is well known to those skilled in the art. It should be appreciated that other types of internal combustion engines may be used for powering the heating system 10.

Figure 10:
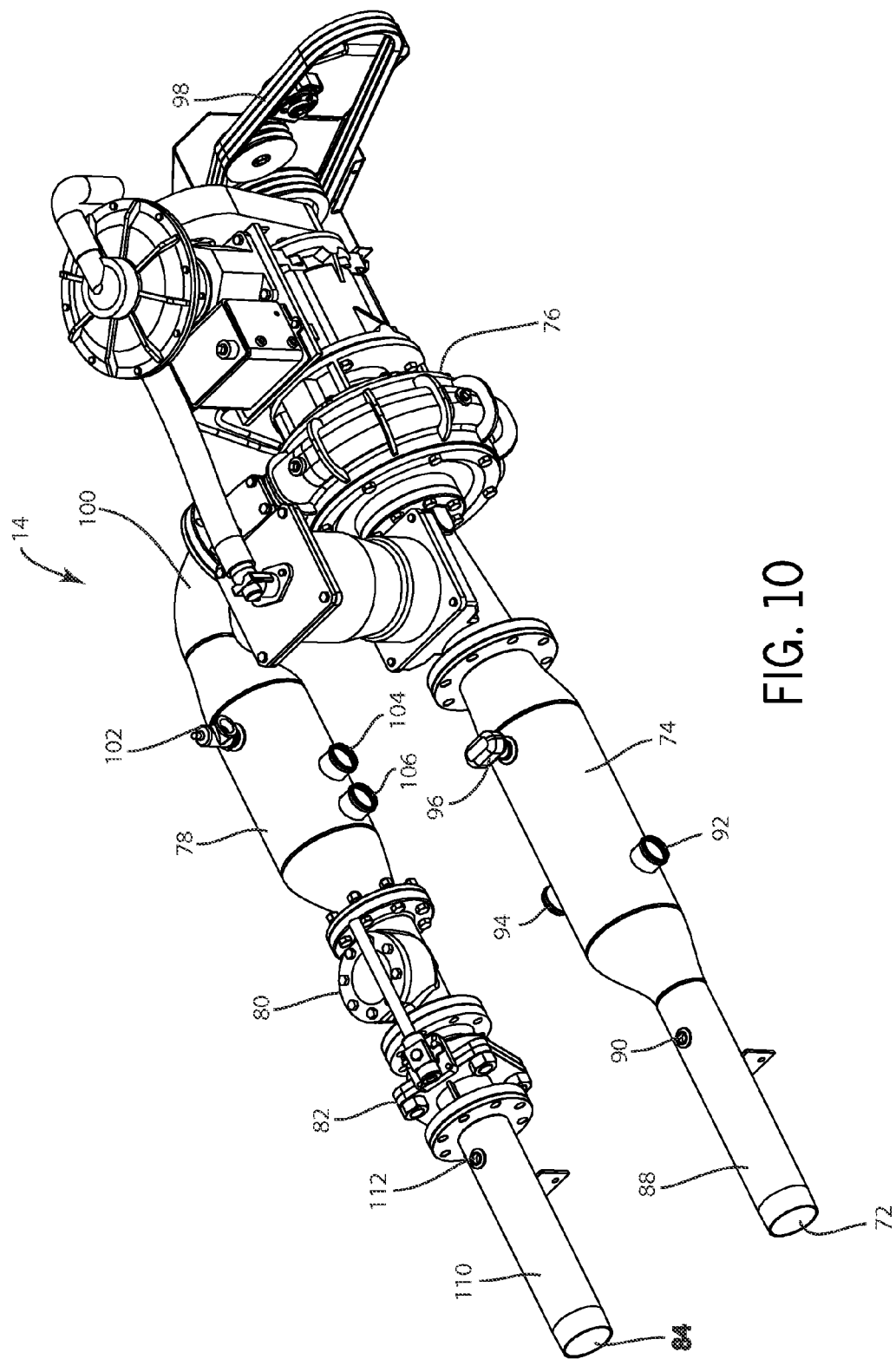
FIG. 10 is a perspective view of a water pump arrangement used in the heating system.
Figure 11:
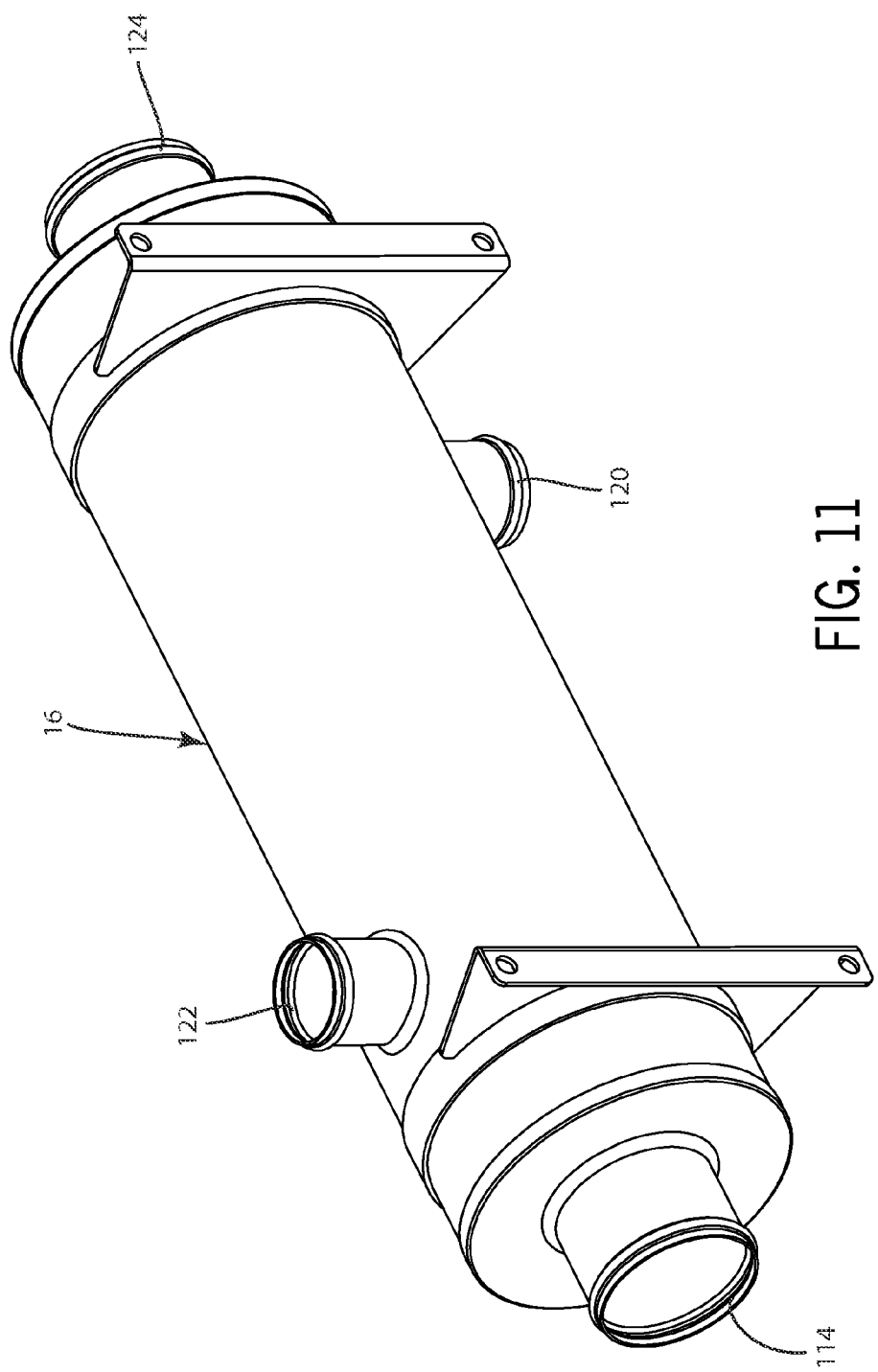
FIG. 11 is a perspective view of a CAC heat exchanger used in the heating system.

As best illustrated in FIG. 10, the water pump arrangement 14 includes a supply fluid inlet 72, an inlet manifold 74, a water pump 76, an outlet manifold 78, a check valve 80, a ball valve 82 and a supply fluid outlet 84, all of which are in fluid communication with each other. The supply fluid inlet 72 is connected by a separate hose (not shown) so that it is in fluid communication with a supply source, such as a supply fluid reservoir 86 (FIG. 7). The supply fluid reservoir 86 is typically a large pool filled with supply fluid, such as water or a water-based solution, which is drawn into the system 10 by pump 76 to be heated. In the exemplary embodiment, the reservoir 86 is located spaced apart or remote from the heating system 10, but the present disclosure contemplates that it could be possible to provide the reservoir 86 on a separate vehicle attached to the heating system 10. The supply fluid inlet 72 is defined by an open end of a supply fluid inlet pipe 88 which is provided with an inlet temperature sensor 90. The pipe 88 leads into the inlet manifold 74 which is connected by a feed line represented at 91 in FIG. 7 to an inlet of the water pump 76. The inlet manifold 74 includes a first inlet 92 connected with the exhaust heat exchanger 20, a second inlet 94 connected with the heat transfer fluid exchanger 26, and a water flow switch 96. The temperature sensor 90 and the water flow switch 96 are used to monitor the heating system 10, and provide an indication of the incoming supply fluid temperature.

The water pump 76 is a self-priming pump that is driven by the engine 12 through a sheave and belt arrangement 98. Because it is self-priming, the pump 76 is able to draw water through the inlet 72 under vacuum when no water is present within the pump 76 or associated piping. As vacuum is increased, air in the system 10 is evacuated via a vent line represented at 99 in FIG. 7, causing supply water to be drawn in. This feature proves to be beneficial when the level of the reservoir 86 is lower than that of the inlet 72. An outlet of the pump 76 is connected by a conduit 100 to the outlet manifold 78 which includes a pressure relief valve 102, a first outlet 104 to supply water to the CAC heat exchanger 16, and a second outlet 106 to supply water to the heat transfer fluid heat exchanger 26. A feed line such as represented at 108 in FIG. 7 connects the outlet manifold 78 with the check valve 80, the ball valve 82, and a supply fluid outlet pipe 110 having an open end defining the supply fluid outlet 84. The check valve 80 is installed such that when the pump 76 is in a priming stage, it does not cause a vacuum with the outlet pipe 110 in the event the end of the pipe 110 is not submerged in an outlet reservoir. The ball valve 82 is used to shut the engine water off in the event of an emergency, or to increase head pressure to force more water to the heat exchangers 16, 18, 20, 26. The ball valve 82 may also be used in the event lower outlet water flows are required. The outlet pipe 110 is provided with an outlet temperature sensor 112 to monitor water temperatures at the outlet 84. Once the heated supply water exits the outlet 84, it returns to the reservoir 86 from which the supply water was drawn, or is delivered to a completely different reservoir or dispensing location depending on the application.

Thus, it should be understood that the water pump 76 is designed to draw supply water in an ambient condition from reservoir 86, and deliver that supply water along a main flow path through the inlet and outlet manifolds 74, 78, respectively, to the outlet 84. As will be described hereafter, the pump 76 also serves to deliver pressurized supply water through other portions of the system 10.

Referring now to FIGS. 2, 5 and 7, the CAC heat exchanger 16 may be a shell and tube heat exchanger designed to cool the compressed high temperature gas or air coming out the compressor discharge 54 of the turbo charger 52 so that the engine 12 has cool, dense air delivered to the intake manifold 48. In the embodiment illustrated in FIG. 11, the CAC heat exchanger 16 has an air inlet 114 for receiving hot gases or air from the turbo charger compressor discharge 54 by means of a hose 116. As the hot air passes through tubes located within the heat exchanger 16, the hot air is cooled down by the supply water from the outlet manifold 78 passing on a shell side of the heat exchanger 16. That is, supply water is forced by water pump 76 from outlet 104 of outlet manifold 78 through a conduit 118 to a water inlet 120 of heat exchanger 16. As the supply water passes through the heat exchanger 16, heat is transferred from the hot gases or air from the compressor discharge 54 so that heated supply-water exits from water outlet 122 on heat exchanger 16. At the same time, this process cools the hot gases or air, and that cooled air is delivered from an air outlet 124 by a hose 126 to the intake manifold 48 of the engine 12.

Figure 12:
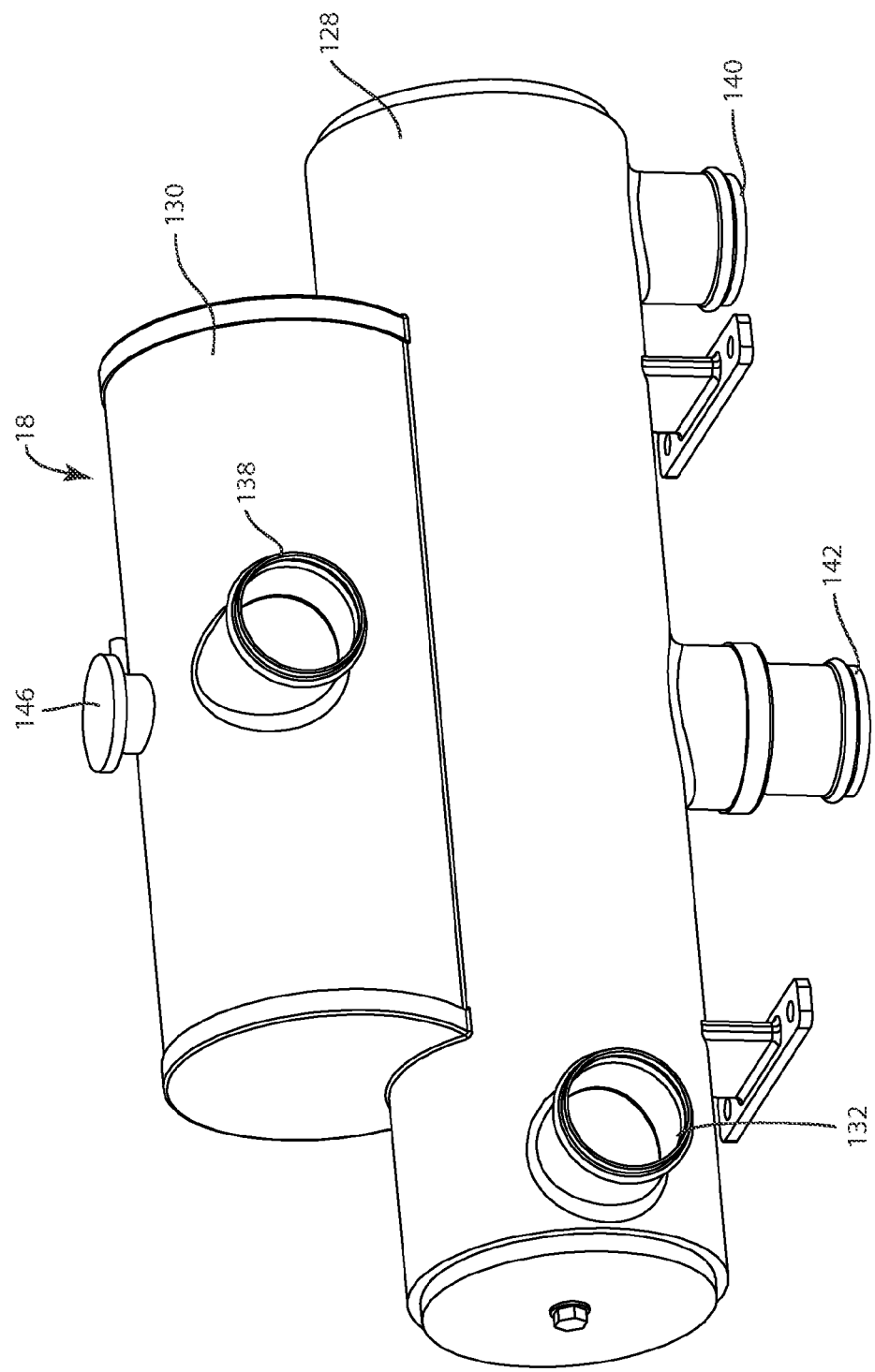
FIG. 12 is a perspective view of an engine coolant heat exchanger used in the heating system.

As best seen in FIG. 12, the engine coolant heat exchanger 18 may be a shell and tube heat exchanger having a lower shell 128 and an upper shell 130 that are designed to cool the hot engine coolant circulating through the engine 12 thereby cooling the engine. In the embodiment illustrated, lower shell 128 has a water inlet 132 for receiving pressurized heated supply water from the water outlet 122 on CAC heat exchanger 16 by means of a hose 134. As the heated supply water from the CAC heat exchanger 16 passes through tubes located within the lower shell 128 of the heat exchanger 18, the heated supply water is further heated by the heated engine coolant from engine 12 passing on the shell side of the heat exchanger 18. That is, hot engine coolant from the engine 12 is pumped by means of a conduit 136 to a coolant inlet 138 located on the upper shell 130. As the heated supply water passes through the lower shell 128, heat is transferred from the hot engine coolant so that supply water is further heated, and exits from a water outlet 140 on the lower shell 128. Simultaneously, this process cools the heated engine coolant, and that cooled engine coolant is delivered from a coolant outlet 142 by a hose represented at 144 (FIG. 7) to the coolant inlet port 58 or water pump on the engine 12. Since the engine cooling system needs to be pressurized to prevent boiling, the upper shell 130 serves as an expansion tank which is provided with a fill port having a pressure cap 146 connected thereto to allow for thermal expansion of the heated engine coolant.

Figure 13:
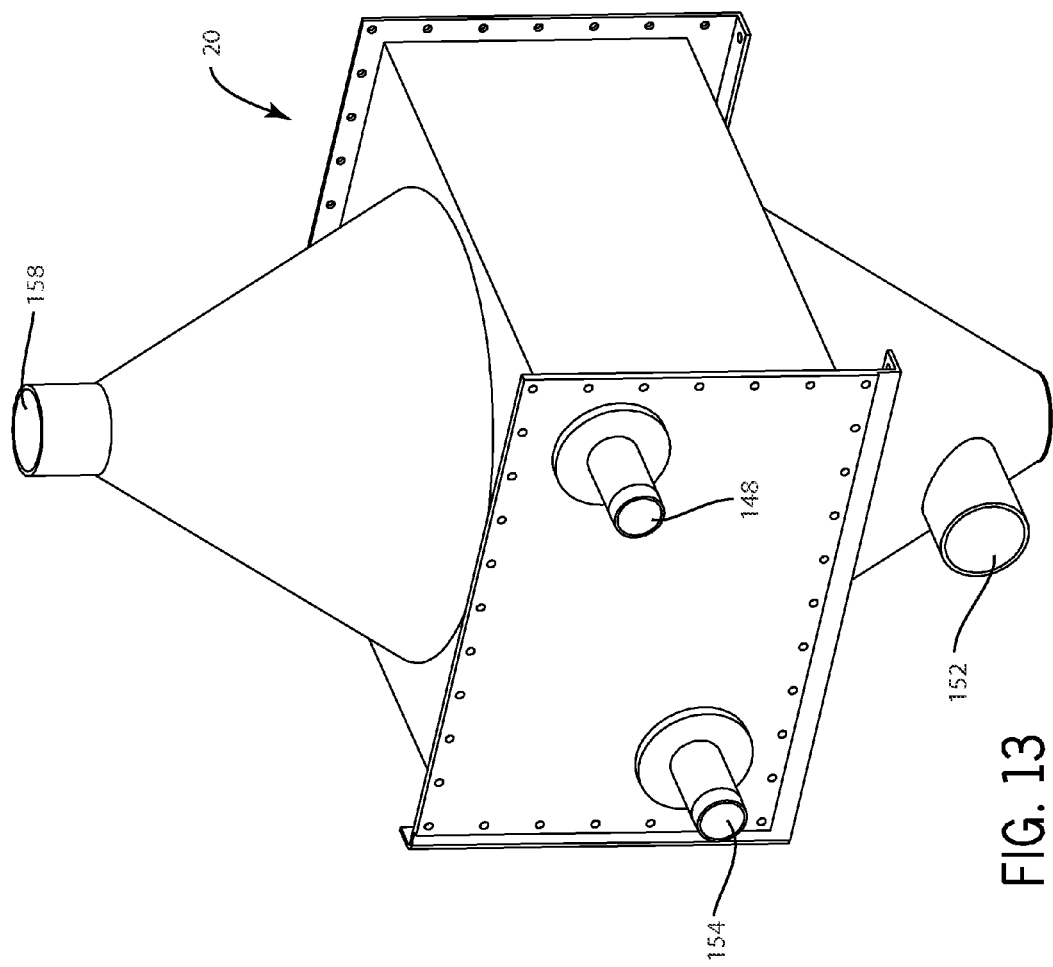
FIG. 13 is a perspective view of an exhaust heat exchanger used in the heating system.

Referring now to FIG. 13, the exhaust heat exchanger 20 may be a radiator-type heat exchanger designed to remove heat from the hot exhaust gases and transfer that heat to the supply water. In the embodiment illustrated heat exchanger 20 has a water inlet 148 for receiving pressurized heated supply water from the water outlet 140 on the engine coolant heat exchanger 18 by means of a hose 150. As the heated supply water from the heat exchanger 18 passes through a series of tubes located within the heat exchanger 20, the heated supply water is further heated by the heated exhaust gases from engine 12 passing on a fin side of the heat exchanger 20, and coming out of the exhaust outlet 56 of the engine 12. That is, hot exhaust gases from the engine 12 are delivered by means of the exhaust conduit 66 to an exhaust inlet 152 on heat exchanger 20. As the heated supply water passes through the heat exchanger 20, heat is transferred from the hot exhaust gases so that the supply water is further heated, and exits from a water outlet 154 of the heat exchanger 20. The heated supply water from water outlet 154 is then delivered via hose 156 back to the inlet 92 and into the inlet manifold 74. The exhaust gases are vented out through the exhaust outlet 158 at the upper end of the heat exchanger 20, and led through the outlet of the discharge pipe 68 to atmosphere outside the top of enclosure 30.

Figure 14:
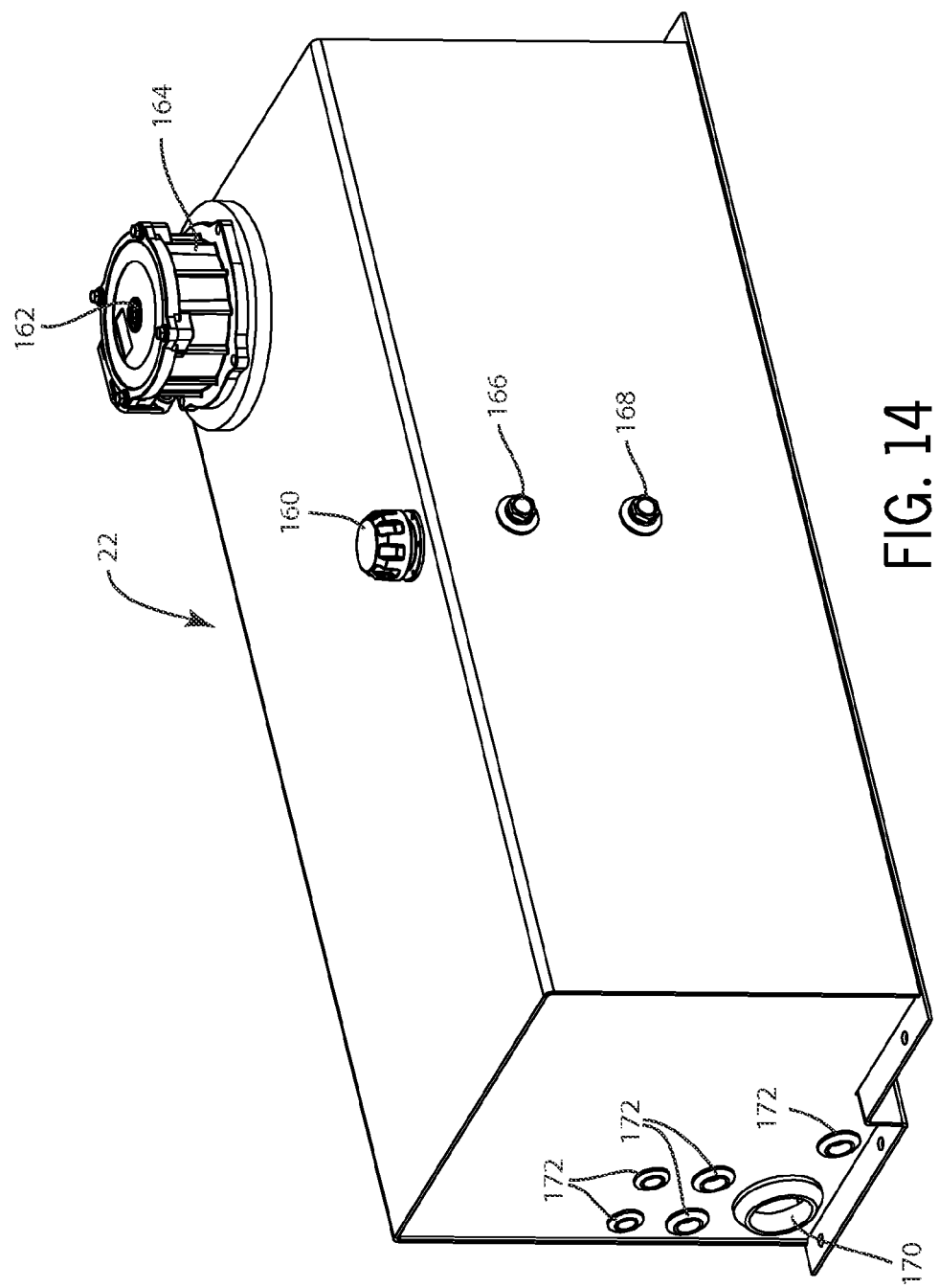
FIG. 14 is a perspective view of a heat transfer fluid reservoir used in the heating system.

Referring now to FIG. 14, the heat transfer fluid reservoir 22 is used to store a supply of heat transfer fluid at an ambient temperature within the heating system 10, add heat transfer fluid to the system 10 and collect heat transfer fluid after it passes through the heat transfer fluid heat exchanger 26. The heat transfer fluid reservoir 22 is a tank having a filler cap 160, an inlet port 162 on a return filter 164, an upper sight glass 166, a lower sight glass 168, an outlet port 170 and auxiliary ports 172 for draining the reservoir 22, venting fluid from the heat generator 24 back to the reservoir 22, taking temperature measurements, etc.

Figure 15:
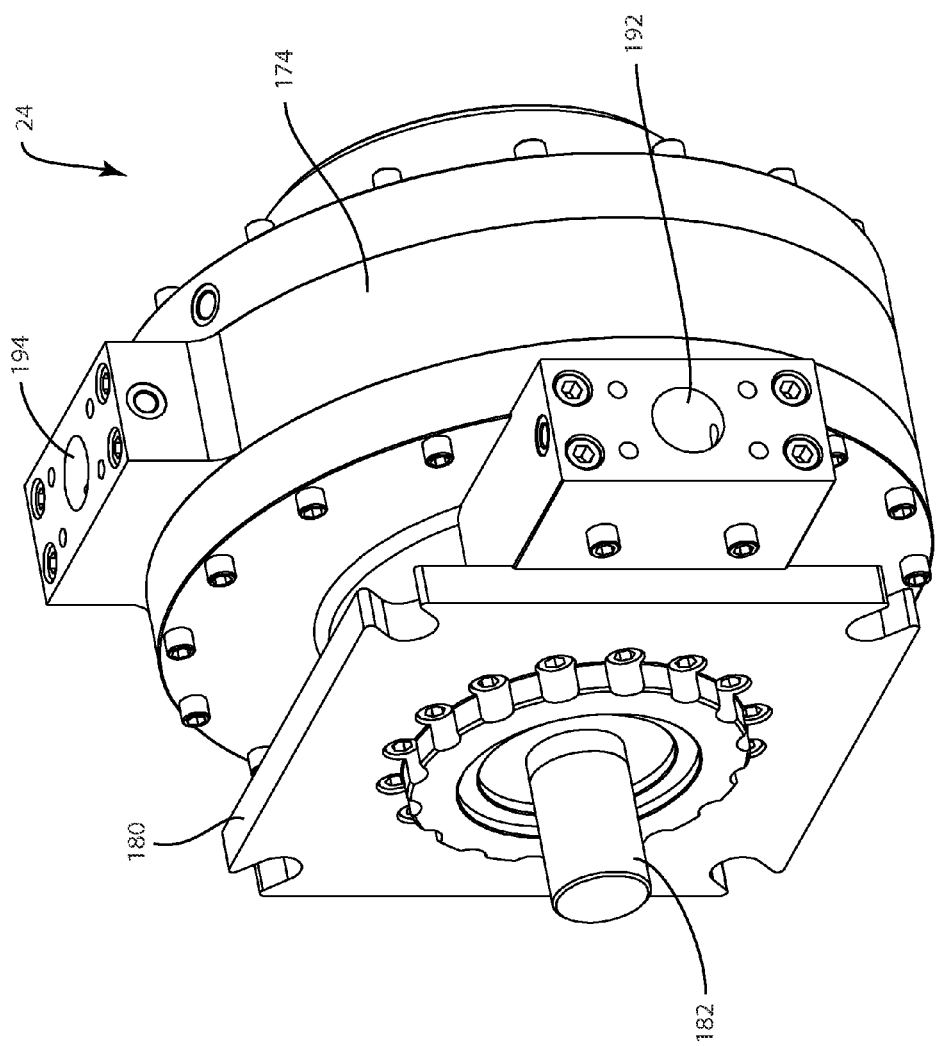
FIG. 15 is a perspective view of a heat generator used in the heating system.
Figure 16:
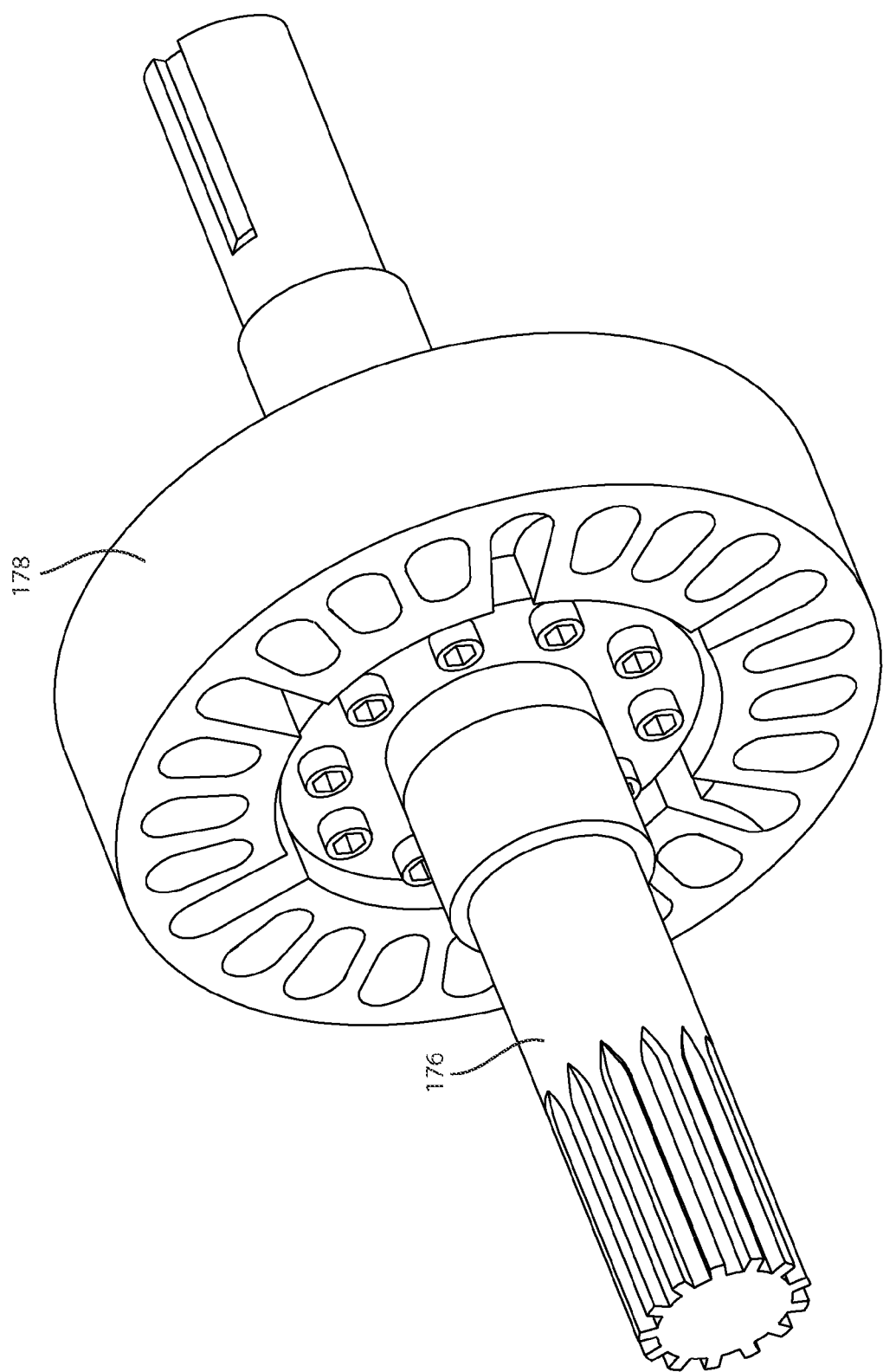
FIG. 16 is a perspective view of a rotor and shaft used in the heat generator.
Figure 17:
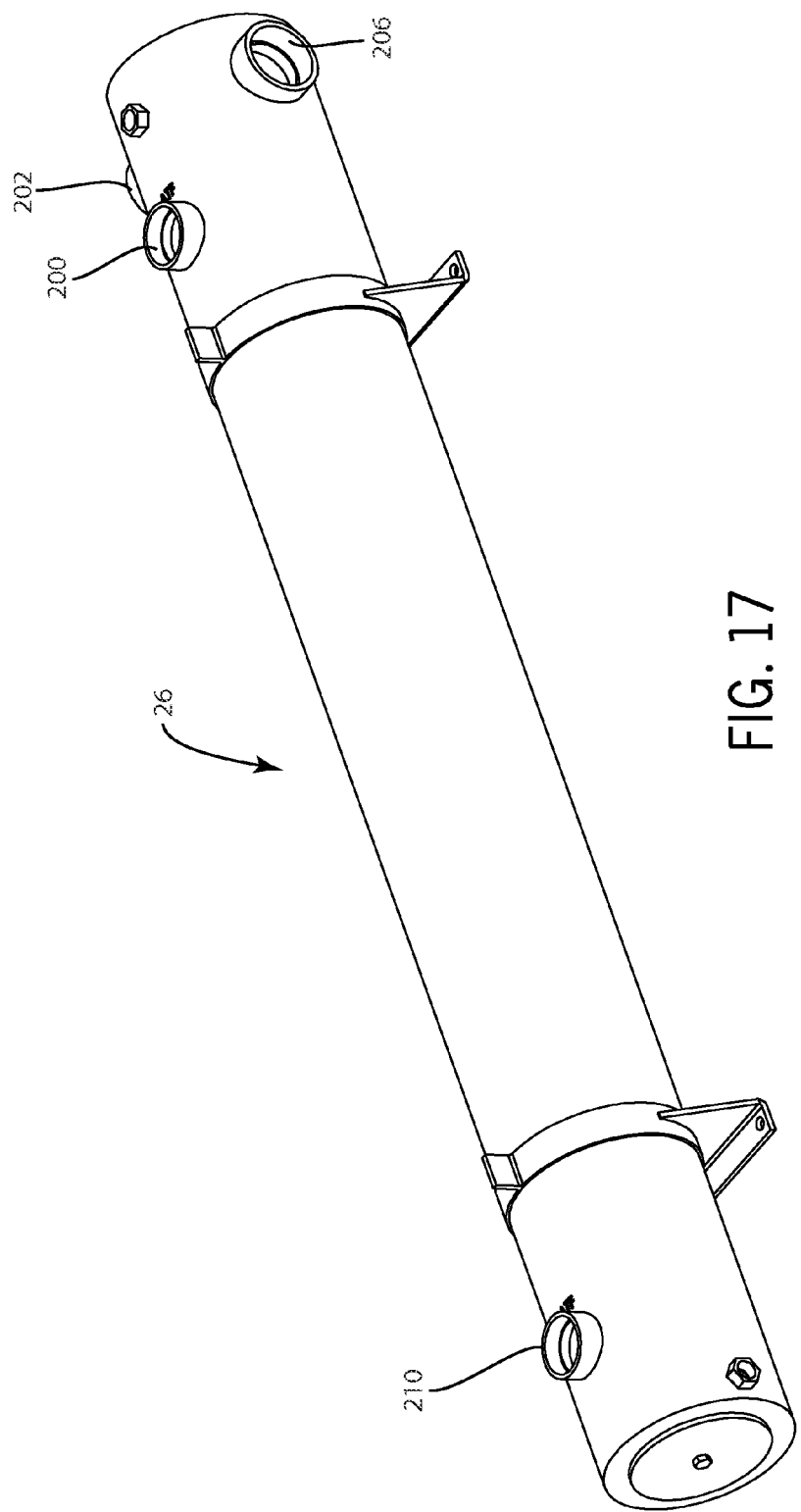
FIG. 17 is a perspective view of a heat transfer fluid heat exchanger used in the heating system.

Referring now to FIGS. 15 and 16, the heat generator 24 is an engine-driven device that converts rotational energy into thermal energy, and is similar to a water-brake dynamometer. The heat generator 24 uses rotary input to instantaneously and directly heat fluids received within the heat generator 24 without a heat exchanger. The heat generator 24 includes a housing 174, a shaft 176 rotatably mounted in the housing 174 and driven by the rotatable engine crankshaft, and a rotor 178 mounted on the shaft 176 within the housing 174. The heat generator 24 further includes a mounting plate assembly 180 which is coupled to the rotatable flywheel 46 of the engine 12 so as to rotate an input end 182 of shaft 176. An outlet or back end of the heat generator 24 is coupled to an input shaft of a charge pump 184 which is a hydraulic gear pump used to deliver heat transfer fluid from the reservoir 22 by means of a conduit represented at 186 (FIG. 7) to an inlet port 188 of the charge pump 184. Heat transfer fluid at ambient temperature is pumped from an outlet port 190 of the charge pump 184 to an inlet port 192 of the heat generator 24 via a hose 191. An acceptable heat generator 24 may be obtained from Island City, LLC of Merrill, Wis.

Heat transfer fluid delivered inside the heat generator 24 is driven by the rotor 178. This results in circulation that causes fluid friction directly creating heat in the heat transfer fluid to provide heated transfer fluid. The heated transfer fluid is pumped out of an outlet port 194 on the heat generator 24, and delivered by a conduit 196 to the heat transfer heat exchanger 26. The heat generator 24 includes a heat transfer fluid temperature switch 198 for controlling the flow of heated transferred fluid from the outlet port 194. In the example shown, the heat transfer fluid is a petroleum-based fluid known commercially as Calflo™, which is manufactured by Petro-Canada Lubricants, Inc. of Mississauga, Ontario, Canada. Calflo™ is chosen to obtain higher boiling temperatures, provide lubrication, prevent corrosion of internal parts of the charge pump 184 and the heat generator 24, and be resistant to oxidative breakdown. Fluids other than Calflo™ may alternatively be used as the heat transfer fluid.

In the exemplary design of the heating system 10 shown in FIG. 7, the heat generator 24 is pressurized, that is to say, the heat generator 24 is positioned at the output side of the charge pump 184. However, the present disclosure also contemplates an alternative design where charge pump 184 still draws heat transfer fluid from reservoir 22, but has its output side placed in fluid communication with the heat transfer fluid heat exchanger 26 so that heat transfer fluid is delivered to the heat generator 24 for direct heating therein before being sent to the reservoir 22. In both designs, however, the charge pump 184 is used to push heat transfer fluid to the heat generator 24.

The present disclosure further contemplates an alternative design wherein the heat generator 24 takes the form of a relief valve arrangement, and the charge pump 184 is replaced by a hydraulic pump. In operation, heat transfer fluid is delivered by the hydraulic pump to the relief valve arrangement where the transfer fluid is heated directly therein by fluid friction before being transferred to the heat exchanger 26.

Referring now to FIGS. 3-7 and 17, the heat transfer fluid heat exchanger 26 may be a shell and tube heat exchanger designed to remove heat from the heated transfer fluid provided by the heat generator 24, and transfer that heat into the supply water. In the illustrated embodiment, the heat exchanger 26 has a heat transfer fluid inlet port 200 for receiving heated transfer fluid pressurized by charge pump 184 from the heat generator 24 via conduit 196. The heat exchanger 26 also has a water inlet port 202 for receiving pressurized supply water from the outlet manifold 78 via a conduit 204. As the supply water passes through tubes in the heat exchanger 26, heat from the heated transfer fluid is transferred to the supply water. The now heated supply water exits from a water outlet port. 206 and is returned via conduit 208 to the inlet 94 on the inlet manifold 74. At the same time, the heated transfer fluid is cooled, and that cooled heat transfer fluid exits heat transfer fluid outlet port 210, and is returned via a conduit 212 through return filter 164 to the heat transfer fluid reservoir 22.

In the aforedescribed heating system 10, drain valves 214 (FIG. 7) are provided for the CAC heat exchanger 16, the heat transfer fluid reservoir 22, the heat transfer fluid heat exchanger 26 and the pump 76 to enable drainage of fluids from those components when desired, such as during servicing of the system 10.

Referring to FIGS. 1-6, the enclosure 30 of the mobile trailer 32 not only protectively houses the main operating components 12, 14, 16, 18, 20, 22, 24, 26, but also contains storage space for job site components, and a fuel tank 216 interconnected in fluid communication with the engine 12. The fuel tank 216 provides a rear mounting surface for the heat transfer fluid heat exchanger 26, and a front mounting surface for an operator control panel 217. The control panel 217 is used by the operator to control and monitor all aspects of the heating system 10.

As seen in FIG. 1, the enclosure 30 is designed with six main openings to gain access to the main operating components. Openings 218, 220 are provided on each side of the enclosure 30 rearwardly thereof, and an opening 222 is configured at the back end of the enclosure 30. In addition, a walk in doorway 224 is provided on the left side of the enclosure 30, and openings (one being seen at 226) are included on each side of a gooseneck portion 228 of the trailer 32. A deck 230 extends rearwardly of the trailer 32 beneath rear opening 222. Although not shown, doors are normally provided for each of the openings 218, 220, 222, 224, 226. A removable skylight panel 232 is fitted on the top, rear portion of the enclosure 30.

In use of the exemplary design shown schematically in FIG. 7, the heating system 10 is placed at a desired location adjacent a supply reservoir 86 that holds a supply fluid, such as water or a water-based solution, which has an ambient temperature. Suitable hoses are connected to the supply fluid inlet 72 and the supply fluid outlet 84 so that they are in fluid communication with the supply fluid reservoir 86. Engine 12 is started, control panel 217 is actuated and the system 10 is primed so that supply fluid is drawn into the supply fluid inlet 72 and transferred along the main flow path by pump 76 through the inlet manifold 74 and the outlet manifold 78 for delivery to the supply fluid outlet 84, and returned back into the reservoir 86.

The system 10 operates such that the pump 76 will continuously deliver a high output flow with the majority of supply fluid flow passing through outlet manifold 78 to the supply fluid outlet 84. However, the system 10 is uniquely designed with a pressure differential between the inlet manifold 74 and the outlet manifold 78, and with a resistance provided by the heat exchangers 16, 18, 20, 26, such that a first portion of the supply fluid is diverted from the first outlet 104 of the outlet manifold 78 via the conduit 118 to a fluid heat exchanger arrangement 16, 18, 20. The supply fluid flows sequentially through the heat exchangers 16, 18, 20 such that heat from the heated engine gases and the heated engine coolant is transferred to the supply fluid to provide a first source of heated supply fluid. This heated supply fluid is delivered via conduit 156 under pressure from pump 76 to the first inlet 92 on the inlet manifold 74 and into the main flow path. During this process, heat is removed from the heated engine gases and the heated engine coolant, and the cooled gases and cooled engine coolant are returned to the engine 12 to enable the engine to run properly.

At the same time, a second portion of the supply fluid is diverted from the second outlet 106 of the outlet manifold 78 via the conduit 204 to the heat transfer fluid heat exchanger 26 which is supplied with transfer fluid that is heated internally by circulation within the heat generator 24. The supply fluid flows through the heat transfer fluid heat exchanger 26 such that heat is transferred from the heated transfer fluid to the supply fluid to provide a second source of heated supply fluid which is delivered via conduit 208 under pressure from pump 76 to second outlet 94 of inlet manifold 74 and into the main flow path. During this process, the heat is removed from the heated transfer fluid, and the cooled heat transfer fluid is returned to the heat transfer fluid reservoir 22. The first and second sources of heated supply fluid are then delivered by the pump 76 along the main flow path to the supply fluid outlet 84. The system 10 continues to circulate the heat supply fluid from the supply reservoir 86 using the process described above.

In the example shown in FIG. 7, the heated supply fluid is delivered into the supply fluid outlet 84 which flows back into the supply reservoir 86. However, it should be understood that the heated supply fluid can be delivered to a supply fluid outlet 84 which is in fluid communication with a reservoir other than supply reservoir 86, or with a different delivery site, such as a wellbore of a gas or oil well.

Accordingly, the present disclosure thus provides a self-contained, flameless mobile heating system for heating water or other fluids which system employs a unique arrangement of heat exchangers and a heat generator, and uses a pressurized supply fluid flow pattern through the heat exchangers which results in providing a highly efficient volume of heated supply fluid.

What is claimed is:
1. A heating system comprising:
an internal combustion engine provided with engine coolant and gases, and configured to heat the engine coolant and the gases during operation of the engine to provide heated engine coolant and heated engine gases;
a supply source providing a supply fluid in fluid communication with a supply fluid inlet;
a supply fluid outlet in fluid communication with the supply fluid inlet and the supply source;
a heat generator being in fluid communication with a supply of heat transfer fluid and configured to provide heated transfer fluid;
a fluid heat exchanger arrangement in fluid communication with the supply fluid and the engine, and configured for transferring heat from the heated engine coolant and heated engine gases to the supply fluid to heat the supply fluid;
a heat transfer fluid heat exchanger in fluid communication with the heat generator and the supply fluid and configured for transferring heat from the heated transfer fluid to the supply fluid to further supply heated supply fluid;

a pump having a pump inlet in fluid communication with an inlet manifold and the supply fluid inlet, and a pump outlet in fluid communication with an outlet manifold and the supply fluid outlet;

the pump, the inlet and outlet manifolds and the supply fluid inlet and the supply fluid outlet being connected together to the supply source to define a main flow path such that the pump transfers the supply fluid along the main flow path from the supply fluid inlet through the inlet and outlet manifolds to the supply fluid outlet;

the inlet manifold having a first inlet and a second inlet located in the main flow path, the first inlet being connected with one side of the fluid heat exchanger arrangement, and the second inlet being connected with the heat transfer fluid heat exchanger, the outlet manifold having a first outlet and a second outlet located in the main flow path, the first outlet being connected with another side of the fluid heat exchanger arrangement, and the second outlet being connected downstream of the first outlet with the heat transfer fluid heat exchanger;

the heating system being configured to supply heated supply fluid such that a first flow portion of the supply fluid is diverted from the first outlet in the main flow path and the outlet manifold around the pump and through the fluid heat exchanger arrangement to provide a first source of heated supply fluid at the first inlet to the inlet manifold and the main flow path;

wherein a second flow portion of the supply fluid is diverted from the second outlet in the main flow path and the outlet manifold around the pump and the fluid heat exchanger arrangement to the heat transfer fluid heat exchanger to provide a second source of heated supply fluid at the second inlet upstream of the first inlet to the inlet manifold and the main flow path; and wherein the first and second sources of heated supply fluid are combined in the inlet manifold and are delivered by the pump along the main flow path to the supply fluid outlet.

2. The heating system of claim 1, wherein the heat generator is mechanically driven by the engine.

3. The heating system of claim 1, wherein the heat generator has a housing, a shaft rotatably mounted in the housing and driven by a rotatable crankshaft of the engine, and a rotor mounted on the shaft for rotation therewith within the housing such that the heat transfer fluid is received and circulated in the housing by means of rotation of the rotor.

4. The heating system of claim 1, including a heat transfer fluid reservoir for containing the heat transfer fluid.

5. The heating system of claim 4, wherein a charge pump is provided in fluid communication with the heat transfer fluid reservoir and the heat generator and configured for transferring heated transfer fluid to the fluid heat exchanger arrangement.

6. The heating system of claim 1, wherein the fluid heat exchanger arrangement comprises a CAC heat exchanger in fluid communication with the supply fluid and hot gases exiting from a compressor discharge of a turbo charger of the engine, the CAC heat exchanger being configured for transferring heat from the hot gases of the compressor discharge to the supply fluid to heat the supply fluid and provide heated supply fluid, and configured for enabling return of cooled gases to an air intake manifold of the engine.

7. The heating system of claim 6, wherein the fluid heat exchanger arrangement further comprises an engine coolant heat exchanger in fluid communication with the heated supply fluid from the CAC heat exchanger and the heated engine coolant of the engine and configured for transferring heat from the heated engine coolant to the heated supply fluid exiting the CAC heat exchanger, and configured for enabling cooled engine coolant to return to the engine.

8. The heating system of claim 7, wherein the fluid heat exchanger arrangement further comprises an exhaust heat exchanger in fluid communication with the heated supply fluid from the engine coolant heat exchanger and exhaust gas exiting from the engine and configured for transferring heat from the exhaust gas to the heated supply fluid exiting the engine coolant heat exchanger, and configured for enabling discharge of the cooled exhaust gas to the atmosphere.

9. The heating system of claim 1, wherein the engine, the heat generator and the fluid heat exchanger arrangement are mounted on a mobile trailer.

10. The heating system of claim 1, wherein the fluid heat exchanger arrangement includes a CAC heat exchanger, an engine coolant heat exchanger, and an exhaust heat exchanger.

11. A heating system comprising:
an internal combustion engine provided with engine coolant and gases and configured to heat the engine coolant and the gases during operation of the engine to provide heated engine coolant and heated engine gases;

a supply source providing a supply fluid in fluid communication with a supply fluid inlet;

a supply fluid outlet in fluid communication with the supply fluid inlet and the supply source;

a fluid heat exchanger arrangement being in fluid communication with the supply fluid of the supply source and the engine coolant and the gases of the engine and configured for receiving heated engine coolant and heated engine gases, and configured for transferring heat from the heated engine coolant and the heated engine gases to the supply fluid to heat the supply fluid;

a heat generator in fluid communication with a heat transfer fluid reservoir containing a heat transfer fluid, the heat transfer fluid circulating within the heat generator to create fluid friction therein to heat the transfer fluid and provide heated transfer fluid;

a heat transfer fluid heat exchanger in fluid communication with the heat generator and the supply fluid for receiving the heated transfer fluid from the heat generator, and configured for transferring heat from the heated transfer fluid to the supply fluid to further provide heated supply fluid;

a pump having a pump inlet in fluid communication with an inlet manifold and the supply fluid inlet, and a pump outlet in fluid communication with an outlet manifold and the supply fluid outlet, the pump, the inlet and outlet manifolds, and the supply fluid inlet and the supply fluid outlet being connected together to the supply source to define a main flow path such that the pump transfers the supply fluid along the main flow path from the supply fluid inlet through the inlet and outlet manifolds to the supply fluid outlet, the inlet manifold having a first inlet and a second inlet located in the main flow path, the first inlet being connected with the pump inlet and the fluid heat exchanger arrangement and the second inlet being connected with the heat transfer fluid heat exchanger, the outlet manifold having a first outlet and a second outlet located in the main flow path, the first outlet being connected with the pump outlet and the fluid heat exchanger arrangement and the second outlet being connected downstream of the first outlet with the heat transfer fluid heat exchanger, the heating system being configured such that a first flow portion of the supply fluid is diverted from the first outlet in the main flow path and the outlet manifold to the fluid heat exchanger arrangement so that heat from the heated engine gases and the heated engine coolant is transferred to the supply fluid to provide a first source of heated supply fluid at the first inlet to the inlet manifold and the main flow path, wherein, at the same time that the first flow portion of supply fluid is diverted, a second flow portion of the supply fluid is diverted from the second outlet in the main flow path and the outlet manifold to the heat transfer fluid heat exchanger such that heat from the heated transfer fluid is transferred to the supply fluid to provide a second source of heated supply fluid at the second inlet upstream of the first inlet to the inlet manifold and the main flow path, and wherein the first and second sources of heated supply fluid are combined in the inlet manifold and delivered by the pump along the main flow path to the supply fluid outlet.

12. The heating system of claim 11, wherein the pump is in fluid communication with the supply fluid for moving the supply fluid through the fluid heat exchanger arrangement.

13. The heating system of claim 11, wherein the fluid heat exchanger arrangement further includes a CAC heat exchanger in fluid communication with the first outlet and the supply fluid and hot gases exiting from a compressor discharge of a turbo charger of the engine, the CAC heat exchanger being configured for transferring heat from the hot gases of the compressor discharge to the supply fluid to heat the supply fluid and provide heated supply fluid, and configured for enabling return of cooled gases to an air intake manifold of the engine.

14. The heating system of claim 13, wherein the fluid heat exchanger arrangement further includes an engine coolant heat exchanger in fluid communication with the heated supply fluid from the CAC heat exchanger and the heated engine coolant of the engine and configured for transferring heat from the heated engine coolant to the heated supply fluid exiting the CAC heat exchanger, and configured for enabling cooled engine coolant to return to the engine.

15. The heating system of claim 14, wherein the fluid exchanger arrangement further includes an exhaust heat exchanger in fluid communication with the first inlet and the heated supply fluid from the engine coolant heat exchanger and exhaust gas exiting from the engine and configured for transferring heat from the exhaust gas to the heated supply fluid exiting the engine coolant heat exchanger, and configured for enabling discharge of the cooled exhaust gas to the atmosphere.

16. The heating system of claim 12, wherein a charge pump is provided in fluid communication with the heat transfer fluid reservoir for transferring heat transfer fluid to the heat generator.

17. The heating system of claim 16, wherein the pump, the charge pump and the heat generator are mechanically driven by the engine.

18. The heating system of claim 11, wherein the engine, and the fluid heat exchanger arrangement are located on a mobile trailer provided with an enclosure, a set of ground engaging wheels and a hitching arrangement.

19. The heating system claim 18, wherein the supply source is a supply reservoir located remote from the mobile trailer.

20. The heating system of claim 15, wherein the first flow portion of the supply fluid flows sequentially through the CAC heat exchanger, the engine coolant heat exchanger and the exhaust heat exchanger.

21. A heating system comprising:
an internal combustion engine provided with engine coolant and gases and configured to heat the engine coolant and the gases during operation of the engine to provide heated engine coolant and heated engine gases;
a supply source providing a supply fluid in fluid communication with a supply fluid inlet;
a supply fluid outlet in fluid communication with the supply fluid inlet and the supply source;
a fluid heat exchanger arrangement in fluid communication with the supply fluid of the supply source and the engine coolant and gases of the engine for receiving the heated engine coolant and the heated gases of the engine;
a heat generator in fluid communication with a heat transfer fluid reservoir containing a heat transfer fluid, the heat generator being configured for receiving the heat transfer fluid and circulating the heat transfer fluid within the heat generator to create fluid friction therein to directly heat the heat transfer fluid and provide heated transfer fluid;
a heat transfer fluid heat exchanger in fluid communication with the heat generator and the supply fluid for receiving the heated transfer fluid from the heat generator; and
a pump having a pump inlet in fluid communication with an inlet manifold and the supply fluid inlet, and a pump outlet in fluid communication with an outlet manifold and the supply fluid outlet, the pump, the inlet and outlet manifolds, and the supply fluid inlet and the supply fluid outlet being connected together to the supply source to define a main flow path such that the pump transfers the supply fluid along the main flow path from the supply fluid inlet through the inlet and outlet manifolds to the supply fluid outlet, the inlet manifold having a first inlet and a second inlet located in the main flow path, the first inlet being connected with the pump inlet and the fluid heat exchanger arrangement, and the second inlet being connected with the heat transfer fluid heat exchanger, the outlet manifold having a first outlet and a second outlet located in the main flow path, the first outlet being connected with the pump outlet and the fluid heat exchanger arrangement and the second outlet being connected downstream of the first outlet with the heat transfer fluid heat exchanger, the heating system being configured such that a first flow portion of the supply fluid is diverted from the first outlet in the main flow path and the outlet manifold to the fluid heat exchanger arrangement so that heat from the heated engine gases and the heated engine coolant is transferred to the supply fluid to provide a first source of heated supply fluid at the first inlet to the inlet manifold and the main flow path, wherein, at the same time that the first flow portion of the supply fluid is diverted, a second flow portion of the supply fluid is diverted from the second outlet in the main flow path and the outlet manifold to the heat transfer fluid heat exchanger such that heat from the heated transfer fluid is transferred to the supply fluid to provide a second source of heated supply fluid at the second inlet upstream of the first inlet to the inlet manifold and the main flow path, wherein the first and second sources of heated supply fluid are combined in the inlet manifold and delivered by the pump along the main flow path to the supply fluid outlet, and wherein the fluid heat exchanger arrangement includes a CAC heat exchanger in fluid communication with the first outlet, an engine coolant heat exchanger in fluid communication with the CAC heat exchanger, and an exhaust heat exchanger in fluid communication with the engine coolant heat exchanger and the first inlet.

* * * * *